US012614741B2

(12) United States Patent
Woo

(10) Patent No.: US 12,614,741 B2
(45) Date of Patent: Apr. 28, 2026

(54) FUEL CELL SYSTEM AND CONDENSATE WATER STORAGE DEVICE

(71) Applicants:HYUNDAI MOTOR COMPANY, Seoul (KR); Kia Corporation, Seoul (KR)

(72) Inventor: Myeong Nam Woo, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 346 days.

(21) Appl. No.: 17/731,511

(22) Filed: Apr. 28, 2022

(65) Prior Publication Data

US 2022/0376282 A1 Nov. 24, 2022

(30) Foreign Application Priority Data

May 20, 2021 (KR) ........................ 10-2021-0065082
May 24, 2021 (KR) ........................ 10-2021-0066413

(51) Int. Cl.
*H01M 8/04119* (2016.01)
(52) U.S. Cl.
CPC .... *H01M 8/04164* (2013.01); *H01M 2250/20* (2013.01)
(58) Field of Classification Search
CPC ......... H01M 8/04164; H01M 8/04141; H01M 2250/20
See application file for complete search history.

(56) References Cited

U.S. PATENT DOCUMENTS

| | | | | |
|---|---|---|---|---|
| 2001/0055707 A1* | 12/2001 | Roberts | ............. | H01M 8/04253 429/444 |
| 2005/0026011 A1* | 2/2005 | Suzuki | .................... | C01B 3/384 429/441 |
| 2006/0131531 A1* | 6/2006 | Ohmori | ............. | H01M 8/04156 251/129.15 |
| 2009/0151903 A1* | 6/2009 | Na | .................... | H01M 8/04029 165/104.19 |
| 2010/0055523 A1* | 3/2010 | Ogawa | ............. | H01M 8/04164 429/426 |
| 2013/0295476 A1* | 11/2013 | Sano | ................. | H01M 8/04164 429/414 |

* cited by examiner

*Primary Examiner* — Brian R Ohara
*Assistant Examiner* — Brent C Thomas
(74) *Attorney, Agent, or Firm* — MORGAN, LEWIS & BOCKIUS LLP

(57) ABSTRACT

A condensate water storage device including a storage container having an inlet port through which treatment target gas is introduced, and an outlet port through which the treatment target gas is discharged, the storage container storing condensate water contained in the treatment target gas, and a discharge member having a first end immersed in the condensate water in the storage container and a second end exposed to the outside of the storage container, the discharge member selectively discharging the condensate water to the outside of the storage container based on a supply pressure of the treatment target gas introduced into the storage container.

10 Claims, 19 Drawing Sheets

FUEL CELL SYSTEM AND CONDENSATE WATER STORAGE DEVICE

CROSS-REFERENCE TO RELATED APPLICATION

This application claims priority to and the benefit of Korean Patent Application No. 10-2021-0065082 filed in the Korean Intellectual Property Office on May 20, 2021 and Korean Patent Application No. 10-2021-0066413 filed in the Korean Intellectual Property Office on May 24, 2021, the entire contents of which are incorporated herein by reference.

TECHNICAL FIELD

The present disclosure relates to a fuel cell system and a condensate water storage device, and more particularly, to a fuel cell system and a condensate water storage device, which are capable of selectively adjusting whether to discharge condensate water.

BACKGROUND ART

A fuel cell vehicle (e.g., a hydrogen fuel cell vehicle) is configured to autonomously generate electricity by means of a chemical reaction between fuel (hydrogen) and air (oxygen) and travel by operating a motor.

In general, the fuel cell vehicle may include a fuel cell stack configured to generate electricity by means of an oxidation-reduction reaction between hydrogen and oxygen, a fuel supply device configured to supply fuel (hydrogen) to the fuel cell stack, an air supply device configured to supply the fuel cell stack with air (oxygen) which is an oxidant required for an electrochemical reaction, and a thermal management system (TMS) configured to discharge heat, which is generated from the fuel cell stack and power electronic parts of the vehicle, to the outside of the system and control temperatures of the fuel cell stack and the power electronic parts.

Further, discharge water (condensate water) and exhaust gas (e.g., unreacted hydrogen), which are produced during the operation of the fuel cell stack, may be discharged to the outside through an exhaust pipe.

Meanwhile, various attempts have been made to apply the fuel cell system to construction machines (e.g., forklifts) as well as passenger vehicles (or commercial vehicles).

The main purpose of the passenger vehicle is to travel on the road, and condensate water, which is produced while the passenger vehicle travels (the fuel cell stack operates), may be discharged onto the road. The risk of an accident does not significantly increase even though the condensate water is discharged onto the road. Therefore, the passenger vehicle may freely discharge the condensate water onto the road without restriction on the discharge of condensate water.

In contrast, in the case of a construction machine used in an indoor workplace such as an interior of a factory or warehouse, condensate water, which is produced and discharged onto the floor of the workplace while the construction machine operates (a fuel cell stack operates), may contaminate the floor. Further, the condensate water discharged onto the floor may increase risks of various types of accidents (e.g., a slip-and-fall accident, an electric shock accident, etc.). Therefore, the condensate water, which is produced while the construction machine operates, needs to be discharged only to a predetermined particular location.

However, in the related art, there is a problem in that the condensate water, which is produced from the fuel cell stack while the construction machine operates, is discharged directly onto the floor of the workplace, which contaminates the floor and increases the risk of an accident.

Therefore, recently, various types of studies have been conducted to selectively adjust whether to discharge the condensate water produced while the fuel cell stack operates, but the study result is still insufficient. Accordingly, there is a need to develop a technology to selectively adjust whether to discharge the condensate water produced while the fuel cell stack operates.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure has been made in an effort to provide a fuel cell system and a condensate water storage device, which are capable of selectively adjusting whether to discharge condensate water.

In particular, the present disclosure has been made in an effort to selectively discharge condensate water, which is produced from the fuel cell stack, to a predetermined particular location.

The present disclosure has also been made in an effort to reduce the risks of contamination and accident caused by the discharge of condensate water.

The present disclosure has also been made in an effort to improve safety and reliability and create a comfortable working environment.

The present disclosure has also been made in an effort to selectively discharge condensate water from a storage container without additionally providing a pump or motor for discharging condensate water from the storage container.

The present disclosure has also been made in an effort to simplify a structure and improve a degree of design freedom and spatial utilization.

The present disclosure has also been made in an effort to minimize the amount of condensate water remaining in a humidifier and minimize deterioration in humidification performance caused by frozen condensate water.

The objects to be achieved by the embodiments are not limited to the above-mentioned objects, but also include objects or effects that may be understood from the solutions or embodiments described below.

In one general aspect, a condensate water storage device includes: a storage container having an inlet port through which treatment target gas is introduced, and an outlet port through which the treatment target gas is discharged, the storage container being configured to store condensate water contained in the treatment target gas; and a discharge member having a first end immersed in the condensate water in the storage container and a second end exposed to the outside of the storage container, the discharge member being configured to selectively discharge the condensate water to the outside of the storage container based on a supply pressure of the treatment target gas introduced into the storage container.

This is to selectively discharge condensate water, which is produced from an object (e.g., a fuel cell stack), to a predetermined particular location.

That is, in the case of a construction machine used in an indoor workplace such as an interior of a factory or warehouse, condensate water, which is produced and discharged onto the floor of the workplace while the construction machine operates (a fuel cell stack operates), may contaminate the floor. Further, the condensate water discharged onto the floor may increase risks of various types of accidents (e.g., a slip-and-fall accident, an electric shock accident, etc.). Therefore, the condensate water, which is produced while the construction machine operates, needs to be discharged only to a predetermined particular location.

However, in the related art, there is a problem in that the condensate water, which is produced from the fuel cell stack while the construction machine operates, is discharged directly onto the floor of the workplace, which contaminates the floor and increases the risk of an accident.

In contrast, according to the first embodiment of the present disclosure, the condensate water, which is produced from the fuel cell stack, may be temporarily stored in the storage container and then discharged only to the predetermined particular location without being discharged directly onto the floor of the workplace. Therefore, it is possible to obtain an advantageous effect of inhibiting contamination caused by the condensate water and reducing risks of accidents (e.g., a slip-and-fall accident, an electric shock accident, etc.).

Moreover, according to the first embodiment of the present disclosure, it is possible to discharge the condensate water depending on the supply pressure of the treatment target gas (e.g., the exhaust gas from the fuel cell stack) to be introduced into storage container without additionally providing a pump or motor for discharging the condensate water from the storage container. Therefore, it is possible to obtain an advantageous effect of simplifying the structure and improving the degree of design freedom and spatial utilization.

The storage container may have various structures in accordance with required conditions and design specifications.

For example, the storage container may include a container main body defining the storage space configured to store the condensate water, and a container cover configured to cover the storage space.

According to the first exemplary embodiment of the present disclosure, the condensate water storage device may include a first sealing member disposed between the container main body and the container cover.

Since the gap between the container main body and the container cover may be sealed by the first sealing member interposed between the container cover and the container main body as described above, it is possible to obtain an advantageous effect of minimizing a leak of the condensate water through the gap between the container main body and the container cover.

According to the first exemplary embodiment of the present disclosure, the first end of the discharge member may have a first cross-sectional area, and the second end of the discharge member may have a second cross-sectional area smaller than the first cross-sectional area.

This is based on the fact that when a cross-sectional area of the outlet end of the discharge member is smaller than a cross-sectional area of the inlet end of the discharge member, a speed (discharge speed) of the condensate water at the outlet end of the discharge member increases, and a pressure at the outlet end of the discharge member decreases. Therefore, since the outlet end of the discharge member has a smaller cross-sectional area than the inlet end of the discharge member, a pressure at the outlet end of the discharge member may decrease. Therefore, it is possible to obtain an advantageous effect of further improving efficiency in discharging the condensate water through the discharge member.

In particular, a cross-sectional area of the discharge member may gradually decrease from the first end of the discharge member to the second end of the discharge member.

According to the first exemplary embodiment of the present disclosure, the condensate water storage device may include a fixing member configured to fix the discharge member to the container cover.

According to the first exemplary embodiment of the present disclosure, the condensate water storage device may include a second sealing member disposed between the fixing member and the discharge member.

Since the gap between the fixing member and the discharge member may be sealed by the second sealing member interposed between the fixing member and the discharge member as described above, it is possible to obtain an advantageous effect of minimizing a leak of the condensate water through the gap between the fixing member and the discharge member.

According to the first exemplary embodiment of the present disclosure, the condensate water storage device may include: an opening/closing member configured to selectively open and close the outlet port, and when the supply pressure of the treatment target gas is higher than a reference pressure, the opening/closing member may close the outlet port, and the condensate water may be discharged to the outside through the discharge member.

As described above, according to the first embodiment of the present disclosure, the opening/closing member configured to selectively open or close the outlet port is provided, and the opening/closing member closes the outlet port when the supply pressure of the exhaust gas is higher than the preset reference pressure. Therefore, at a point in time at which the condensate water is discharged, the internal pressure of the storage container may be maintained as a high pressure sufficient enough to discharge the condensate water.

The opening/closing member may have various structures capable of selectively opening or closing the outlet port.

For example, the opening/closing member may include: a valve seat configured to be movable in a direction toward and away from the outlet port; and a support part configured to elastically support a movement of the valve seat relative to the storage container.

Another exemplary embodiment of the present disclosure provides a fuel cell system including: a fuel cell stack; a storage container having an inlet port through which exhaust gas discharged from the fuel cell stack is introduced, and an outlet port through which the exhaust gas is discharged, the storage container being configured to store condensate water contained in the exhaust gas; and a discharge member having a first end immersed in the condensate water in the storage container and a second end exposed to the outside of the storage container, the discharge member being configured to selectively discharge the condensate water to the outside of the storage container based on a supply pressure of the exhaust gas introduced into the storage container.

According to another exemplary embodiment of the present disclosure, the fuel cell system may include a compressor configured to compress inflow gas to be supplied to the fuel cell stack, and the supply pressure of the exhaust gas may be adjusted by a pressure of the inflow gas made by the compressor.

Since the compressor provided to compress the inflow gas, which is to be supplied to the fuel cell stack, is used to discharge the condensate water as described above, it is possible to discharge the condensate water without additionally providing a pump or motor for discharging the condensate water from the storage container. Therefore, it is possible to obtain an advantageous effect of simplifying the structure and improving the degree of design freedom and spatial utilization.

According to another exemplary embodiment of the present disclosure, the fuel cell system may include: a humidifier disposed between the compressor and the fuel cell stack and configured to humidify the inflow gas by using the exhaust gas; and an air control valve disposed between the humidifier and the fuel cell stack and including a bypass flow path configured to selectively allow the inflow gas, which is to be introduced into the fuel cell stack, to flow to the humidifier.

As described above, the high-pressure inflow gas compressed by the compressor flows to the humidifier through the bypass flow path. Therefore, it is possible to obtain an advantageous effect of discharging the condensate water from the storage container in a timely manner, minimizing the amount of condensate water remaining in the humidifier, and inhibiting the condensate water from being frozen in the humidifier.

According to another exemplary embodiment of the present disclosure, the storage container may include: a container main body defining a storage space configured to store the condensate water; and a container cover configured to cover the storage space, and the discharge member may be disposed in the container cover.

According to another exemplary embodiment of the present disclosure, the fuel cell system may include a first sealing member disposed between the container main body and the container cover.

According to another exemplary embodiment of the present disclosure, the fuel cell system may include a fixing member configured to fix the discharge member to the container cover.

According to another exemplary embodiment of the present disclosure, the fuel cell system may include a second sealing member disposed between the fixing member and the discharge member.

According to another exemplary embodiment of the present disclosure, the first end of the discharge member may have a first cross-sectional area, and the second end of the discharge member may have a second cross-sectional area smaller than the first cross-sectional area. In particular, a cross-sectional area of the discharge member may gradually decrease from the first end to the second end of the discharge member.

According to another exemplary embodiment of the present disclosure, the fuel cell system may include an opening/closing member configured to selectively open and close the outlet port, and when the supply pressure of the exhaust gas is higher than a reference pressure, the opening/closing member may close the outlet port, and the condensate water may be discharged to the outside through the discharge member. For example, the opening/closing member may include: a valve seat configured to be movable in a direction toward and away from the outlet port; and a support part configured to elastically support a movement of the valve seat relative to the storage container.

A second exemplary embodiment of the present disclosure provides a condensate water storage device including: a storage container having a storage space configured to store condensate water, and a discharge hole configured to discharge the condensate water to the outside; and a valve unit configured to selectively open or close the discharge hole, in which the valve unit includes: a valve member configured to be movable from a first position at which the valve member closes the discharge hole to a second position at which the valve member opens the discharge hole; and a valve magnetic element disposed on the valve member and configured to generate an attractive force with a base magnetic element disposed at a treatment target location so that the valve member is moved to the second position by the attractive force between the valve magnetic element and the base magnetic element.

This is to selectively discharge condensate water, which is produced from an object (e.g., a fuel cell stack), to a predetermined particular location.

That is, in the case of a construction machine used in an indoor workplace such as an interior of a factory or warehouse, condensate water, which is produced and discharged onto the floor of the workplace while the construction machine operates (a fuel cell stack operates), may contaminate the floor. Further, the condensate water discharged onto the floor may increase risks of various types of accidents (e.g., a slip-and-fall accident, an electric shock accident, etc.). Therefore, the condensate water, which is produced while the construction machine operates, needs to be discharged only to a predetermined particular location.

However, in the related art, there is a problem in that the condensate water, which is produced from the fuel cell stack while the construction machine operates, is discharged directly onto the floor of the workplace, which contaminates the floor and increases the risk of an accident.

In contrast, according to the second embodiment of the present disclosure, the condensate water, which is produced from the fuel cell stack, may be temporarily stored in the storage container and then discharged only to the predetermined particular location without being discharged directly onto the floor of the workplace. Therefore, it is possible to obtain an advantageous effect of inhibiting contamination caused by the condensate water and reducing risks of accidents (e.g., a slip-and-fall accident, an electric shock accident, etc.).

Moreover, according to the second embodiment of the present disclosure, it is possible to obtain an advantageous effect of easily discharging the condensate water, which is stored in the storage container, to the treatment target location only by positioning the valve magnetic element at the treatment target location without performing a separate operation of discharging the condensate water from the storage container. As described above, according to the second embodiment of the present disclosure, the valve magnetic element is disposed on the valve member, and the attractive force is applied between the valve magnetic element and the base magnetic element when the object is positioned at the treatment target location. Further, the attractive force moves the valve member to the second position at which the valve member opens the discharge hole. Therefore, as the object is only moved to the treatment target location, the condensate water stored in the storage container may be easily discharged at the treatment target location even though an operator does not perform a separate operation of opening the discharge hole.

Moreover, a device (or an operating means) for opening the discharge hole need not be separately provided. Therefore, it is possible to obtain an advantageous effect of simplifying the structure and improving the degree of design freedom and spatial utilization.

According to another example of the second exemplary embodiment of the present disclosure, the storage container may include a container main body having the storage space, and a container cover configured to cover the storage space.

According to the second exemplary embodiment of the present disclosure, the condensate water storage device may include: a locking groove provided in the container main body; a locking protrusion provided on the container cover and configured to be locked to the locking groove; and a cut-out slit provided in the container cover and disposed adjacent to the locking protrusion.

Since the container cover and the container main body are locked to each other by means of the locking grooves and the locking protrusions as described above, it is possible to obtain an advantageous effect of stably maintaining the state in which the container cover is coupled to the container main body. In addition, the cut-out slit may be provided at the periphery of the locking protrusion, which makes it possible to improve the dynamic properties of the locking protrusion relative to the container cover and make it easy to couple and separate the locking protrusion to and from the locking groove.

According to the second exemplary embodiment of the present disclosure, the condensate water storage device may include: an overflow hole provided in the container main body, and the condensate water may be discharged to the outside through the overflow hole when a water level of the condensate water exceeds a preset reference water level.

According to the second exemplary embodiment of the present disclosure, the valve unit may include a valve housing connected to the storage container and having a communication hole configured to communicate with the discharge hole. The valve member may close the communication hole at the first position and open the communication hole at the second position.

According to the second exemplary embodiment of the present disclosure, the valve member may rectilinearly move from the first position to the second position.

According to the second exemplary embodiment of the present disclosure, the condensate water storage device may include a housing sealing member interposed between the storage container and the valve housing.

Since the housing sealing member is disposed between the storage container and the valve housing as described above, it is possible to obtain an advantageous effect of minimizing a leak of the condensate water through the gap between the storage container and the valve housing.

According to the second exemplary embodiment of the present disclosure, the condensate water storage device may include: guide rods disposed on the valve housing; and guide holes provided in the valve member and configured to accommodate the guide rods so that the valve member is rectilinearly movable along the guide rods.

As described above, the valve member rectilinearly moves along the guide rods in the state in which the guide rods are inserted into the guide holes. Therefore, it is possible to obtain an advantageous effect of minimizing the separation and torsion of the valve member when the valve member rectilinearly moves relative to the valve housing. Further, it is possible to obtain an advantageous effect of stably supporting the rectilinear movement of the valve member relative to the valve housing.

According to the second exemplary embodiment of the present disclosure, the condensate water storage device may include a valve sealing member configured to seal a portion between the valve member and the valve housing.

Since the valve sealing member is disposed between the valve member and the valve housing as described above, it is possible to obtain an advantageous effect of minimizing a leak of the condensate water through the gap between the valve member and the valve housing in the state in which the valve member is in close contact with the valve housing.

According to the second exemplary embodiment of the present disclosure, the condensate water storage device may include support protrusions disposed on the valve member and configured to support the valve magnetic element on the valve member.

According to the second exemplary embodiment of the present disclosure, the condensate water storage device may include a valve cover connected to the valve housing, configured to surround the valve member, and having discharge flow paths that communicate with the communication hole.

Since the valve cover is provided as described above, it is possible to obtain an advantageous effect of minimizing contamination of and damage to the valve member and further improving driving stability of the valve member.

In particular, the condensate water storage device may include: guide slots provided in the valve cover; and guide protrusions provided on the valve member and configured to be accommodated in the guide slots and movable along the guide slots.

As described above, the valve member rectilinearly moves relative to the valve housing in the state in which the guide protrusions are accommodated in the guide slots. Therefore, it is possible to obtain an advantageous effect of more stably supporting the rectilinear movement of the valve member relative to the valve housing and more effectively inhibiting the separation and torsion of the valve member.

According to the second exemplary embodiment of the present disclosure, the valve unit may include an elastic member configured to elastically support the movement of the valve member relative to the valve housing.

As described above, the movement of the valve member relative to the valve housing is elastically supported by the elastic member. Therefore, when the attractive force is not applied between the valve magnetic element and the base magnetic element (the object moves away from the treatment target location), the valve member may be returned by the elastic force of the elastic member to the first position at which the valve member closes the discharge hole.

Another exemplary embodiment of the present disclosure provides a fuel cell system including: a fuel cell stack; a storage container having a storage space configured to store condensate water produced from the fuel cell stack, and a discharge hole configured to discharge the condensate water to the outside; and a valve unit configured to selectively open or close the discharge hole, in which the valve unit includes: a valve member configured to be movable from a first position at which the valve member closes the discharge hole to a second position at which the valve member opens the discharge hole; and a valve magnetic element disposed on the valve member and configured to generate an attractive force with a base magnetic element disposed at a treatment target location so that the valve member is moved to the second position by the attractive force between the valve magnetic element and the base magnetic element.

According to another exemplary embodiment of the present disclosure, the valve unit may include a valve housing connected to the storage container and having a communication hole configured to communicate with the discharge hole. The valve member may close the communication hole at the first position and open the communication hole at the second position.

According to another exemplary embodiment of the present disclosure, the fuel cell system may include a valve sealing member disposed on the valve member and configured to seal a portion between the valve member and the valve housing.

According to another exemplary embodiment of the present disclosure, the fuel cell system may include a valve cover connected to the valve housing, configured to surround the valve member, and having discharge flow paths that communicate with the communication hole.

According to another exemplary embodiment of the present disclosure, the valve unit may include an elastic member configured to provide an elastic force to allow the valve member to move to the first position.

Other features and aspects will be apparent from the following detailed description, the drawings, and the claims.

DETAILED DESCRIPTION

Figure 1:
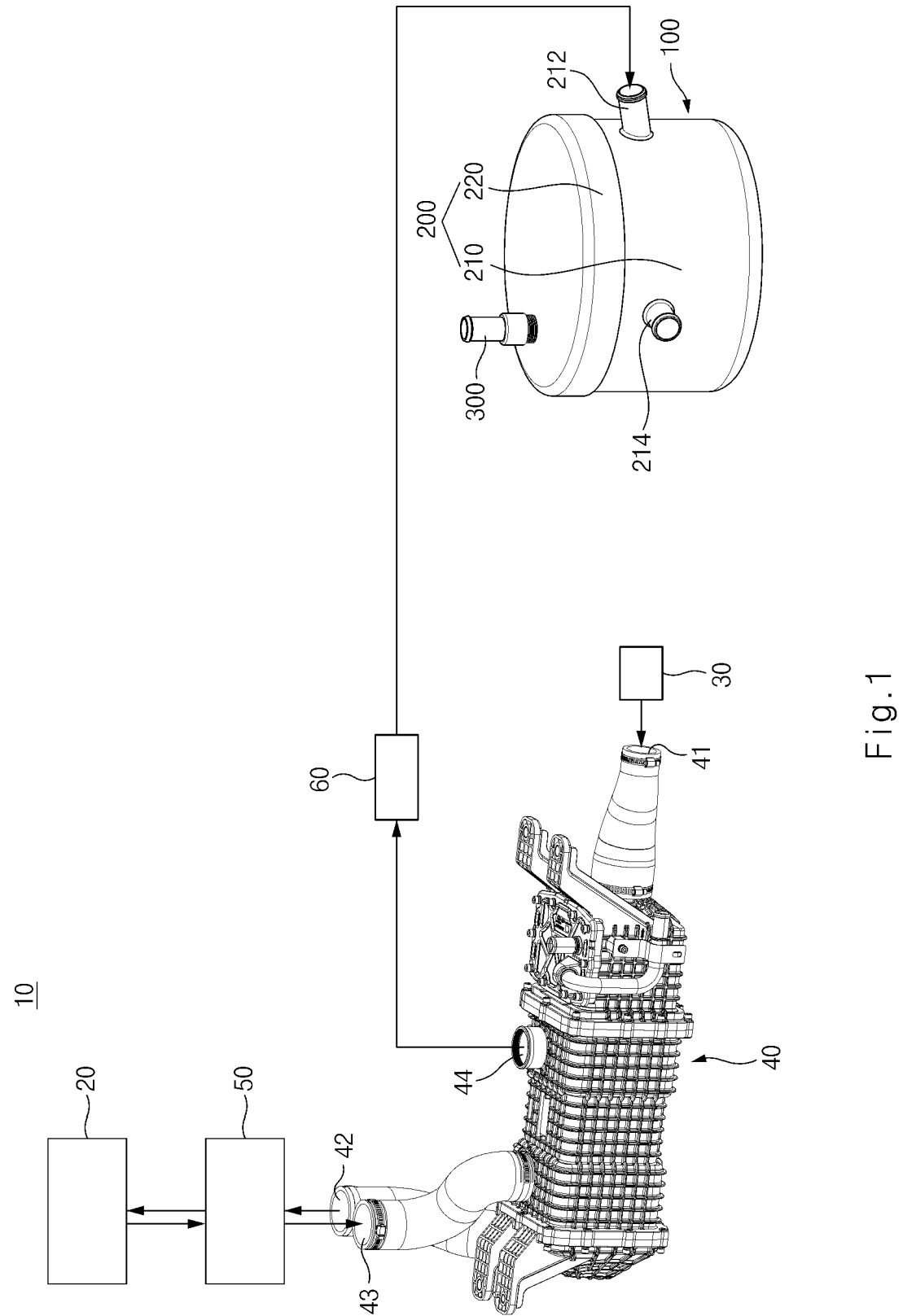
FIG. 1 is a view for explaining a fuel cell system according to a first embodiment of the present disclosure.

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 9, a condensate water storage device 100 according to a first embodiment of the present disclosure includes: a storage container 200 having an inlet port 212 through which treatment target gas is introduced, and an outlet port 214 through which the treatment target gas is discharged, the storage container 200 being configured to store condensate water contained in the treatment target gas; and a discharge member 300 having one end immersed in the condensate water in the storage container 200, and the other end exposed to the outside of the storage container 200, the discharge member 300 being configured to selectively discharge the condensate water to the outside of the storage container 200 depending on a supply pressure of the treatment target gas introduced into the storage container 200.

For reference, the condensate water storage device 100 according to the first embodiment of the present disclosure may be used to store condensate water produced from an object. The present disclosure is not restricted or limited by the type and structure of the object to which the condensate water storage device 100 is applied.

In particular, the condensate water storage device 100 according to the first embodiment of the present disclosure may be used to temporarily store condensate water produced from a fuel cell system 10 applied to a construction machine such as a forklift.

According to another example of the first embodiment of the present disclosure, the condensate water storage device 100 may be applied to mobility vehicles such as various vehicles (e.g., passenger vehicles or commercial vehicles), ships, and aircrafts to which the fuel cell system 10 may be applied.

According to the first exemplary embodiment of the present disclosure, the fuel cell system 10 may include: a fuel cell stack 20; the storage container 200 having the inlet port 212 through which exhaust gas (treatment target gas) discharged from the fuel cell stack 20 is introduced, and the outlet port 214 through which the exhaust gas is discharged, the storage container 200 being configured to store condensate water contained in the exhaust gas; and the discharge member 300 having one end immersed in the condensate water in the storage container 200, and the other end exposed to the outside of the storage container 200, the discharge member 300 being configured to selectively discharge the condensate water to the outside of the storage container 200 depending on a supply pressure of the exhaust gas introduced into the storage container 200.

The fuel cell stack 20 refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) (not illustrated) having catalyst electrode layers in which electrochemical reactions occur and which are attached to two opposite sides of an electrolyte membrane through which hydrogen ions move; a gas diffusion layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

According to the first exemplary embodiment of the present disclosure, the fuel cell system 10 includes a compressor 30 configured to compress inflow gas to be supplied to the fuel cell stack 20.

The compressor 30 is provided in an air supply line (not illustrated) for supplying the inflow gas (air) to the fuel cell stack 20. The inflow gas supplied along the air supply line may be compressed by the compressor 30 and supplied in a compressed state to the fuel cell stack 20.

More specifically, the compressor 30 may compress the air so that the inflow gas to be supplied to the fuel cell stack 20 may have a sufficient pressure that enables the inflow gas to pass through a flow path in the fuel cell stack 20.

Various compressors 30 capable of compressing the inflow gas may be used as the compressor 30. The present disclosure is not restricted or limited by the type and structure of the compressor 30. For example, the compressor 30 may be configured to compress and supply the inflow gas using a centrifugal force generated by a rotation of a rotor (not illustrated).

According to the first exemplary embodiment of the present disclosure, the fuel cell system 10 may include a humidifier 40 configured to humidify inflow gas (dry air) by using exhaust gas (moist air) discharged from the fuel cell stack 20.

The humidifier 40 may have various structures capable of humidifying the inflow gas by using the exhaust gas discharged from the fuel cell stack 20. The present disclosure is not restricted or limited by the type and structure of the humidifier 40.

For example, the humidifier 40 is disposed between the compressor 30 and the fuel cell stack 20. The humidifier 40 may include an inflow gas supply port 41 through which the inflow gas is introduced (supplied), an inflow gas discharge port 42 through which the (humidified) inflow gas having passed through the interior of the humidifier 40 is discharged, an exhaust gas supply port 43 through which the exhaust gas discharged from the fuel cell stack 20 is supplied, and an exhaust gas discharge port 44 through which the exhaust gas, which has humidified the inflow gas, is discharged to the outside.

The inflow gas supplied through the inflow gas supply port 41 may be humidified by the exhaust gas while passing through a humidification membrane (e.g., a hollow fiber membrane) (not illustrated) disposed in the humidifier 40. Then, the humidified inflow gas may be supplied to the fuel cell stack 20 through the inflow gas discharge port 42.

Further, the exhaust gas (or produced water) discharged from the fuel cell stack 20 may be supplied to the exhaust gas supply port 43, humidify the inflow gas in the humidifier 40, and then be discharged to the storage container 200 through the exhaust gas discharge port 44.

The storage container 200 serves to store the condensate water discharged to the outside of the humidifier 40 through the exhaust gas discharge port 34.

In particular, a silencer 60 may be disposed on a connection line (not illustrated) that connects the humidifier 40 and the storage container 200. The silencer 40 may serve to reduce discharge noise of exhaust gas discharged along the connection line.

In the first embodiment of the present disclosure illustrated and described above, the example has been described in which the condensate water produced from the fuel cell stack 20 is supplied to the storage container 200 via the humidifier 40 and the silencer 60. However, according to another example of the first embodiment of the present disclosure, the condensate water produced from the fuel cell stack may be supplied directly to the storage container.

Figure 2:
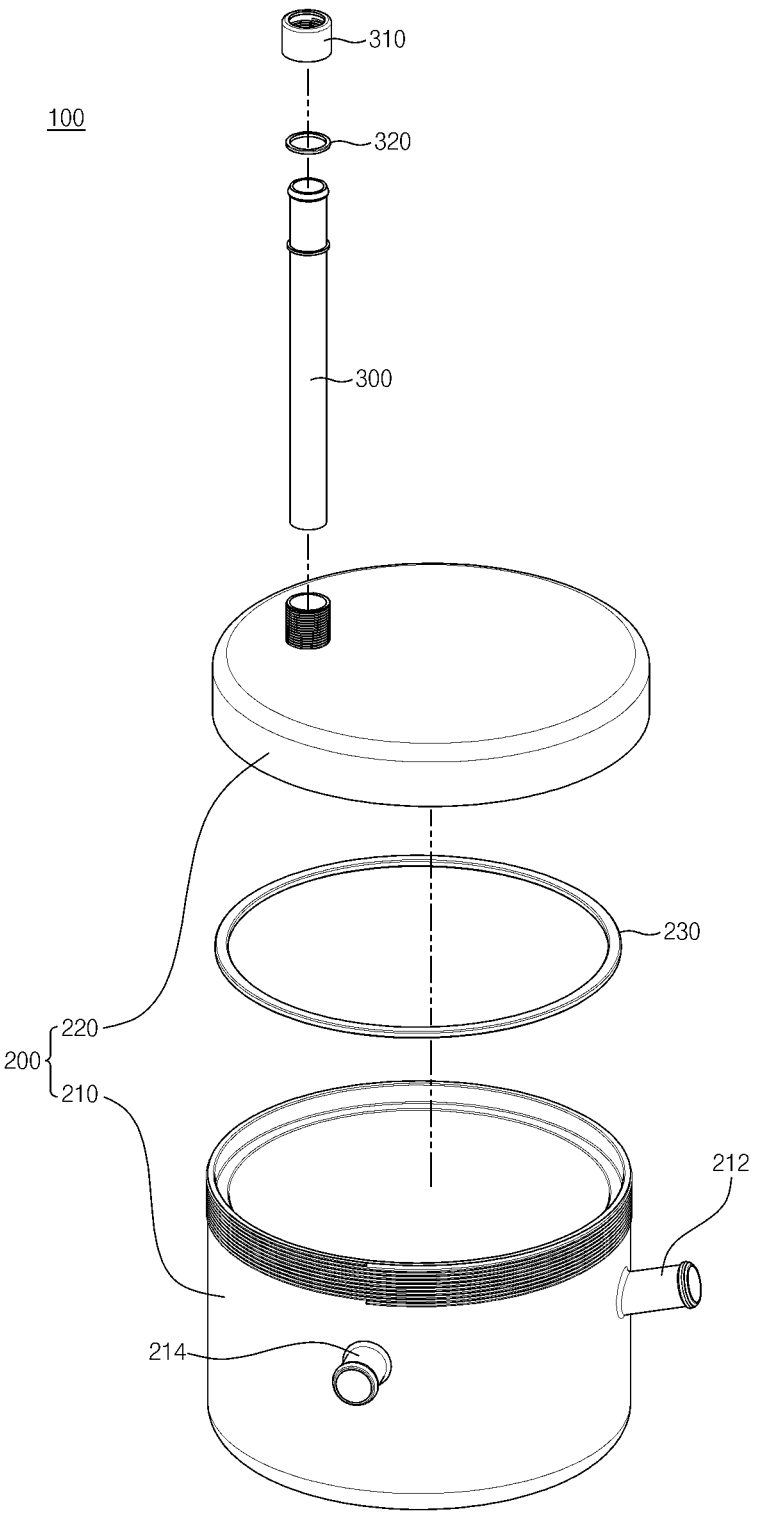
FIG. 2 is a view for explaining a condensate water storage device of the fuel cell system according to the first embodiment of the present disclosure.
Figure 3:
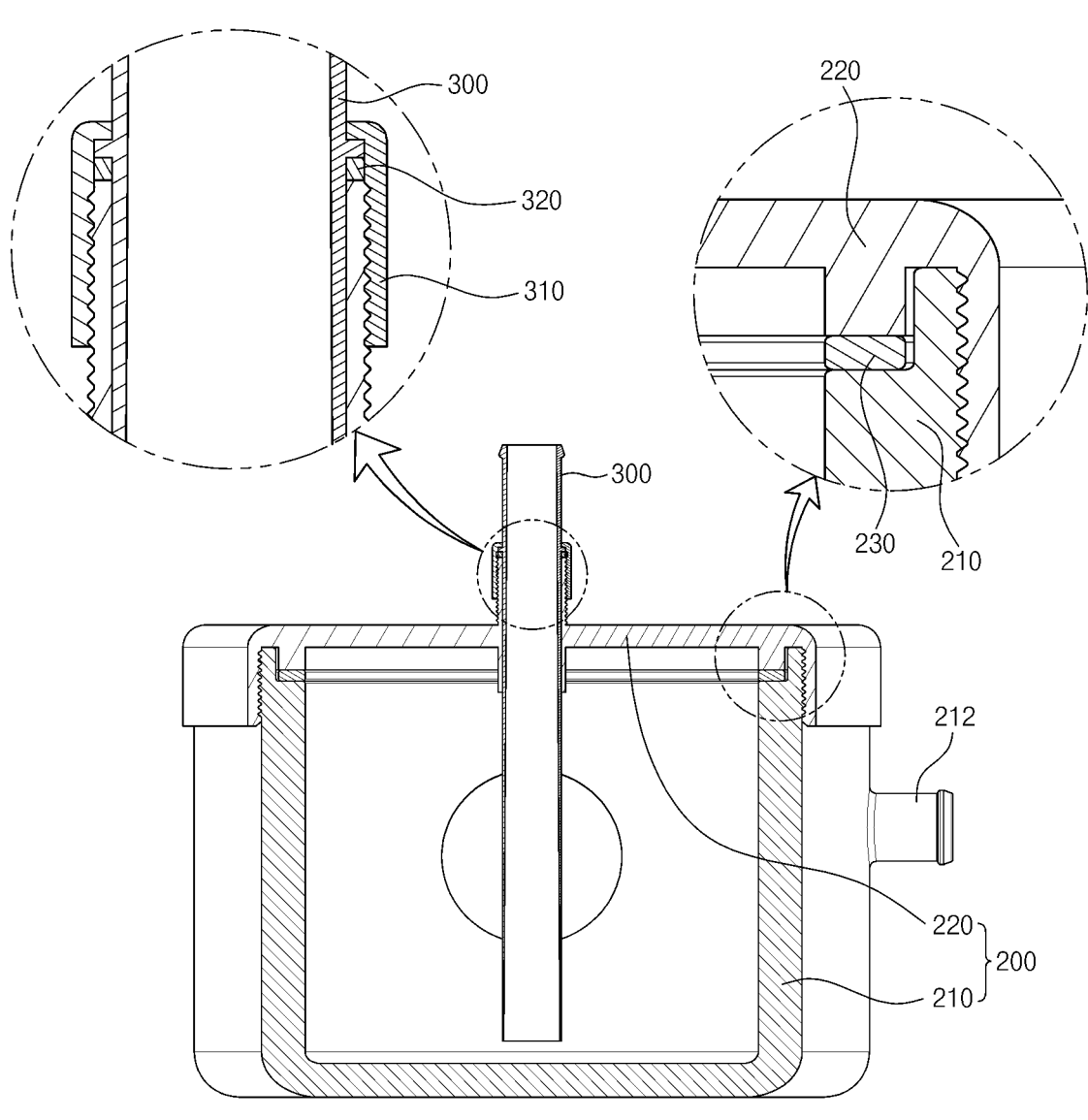
FIG. 3 is a view for explaining a storage container of the fuel cell system according to the first embodiment of the present disclosure.
Figure 4:
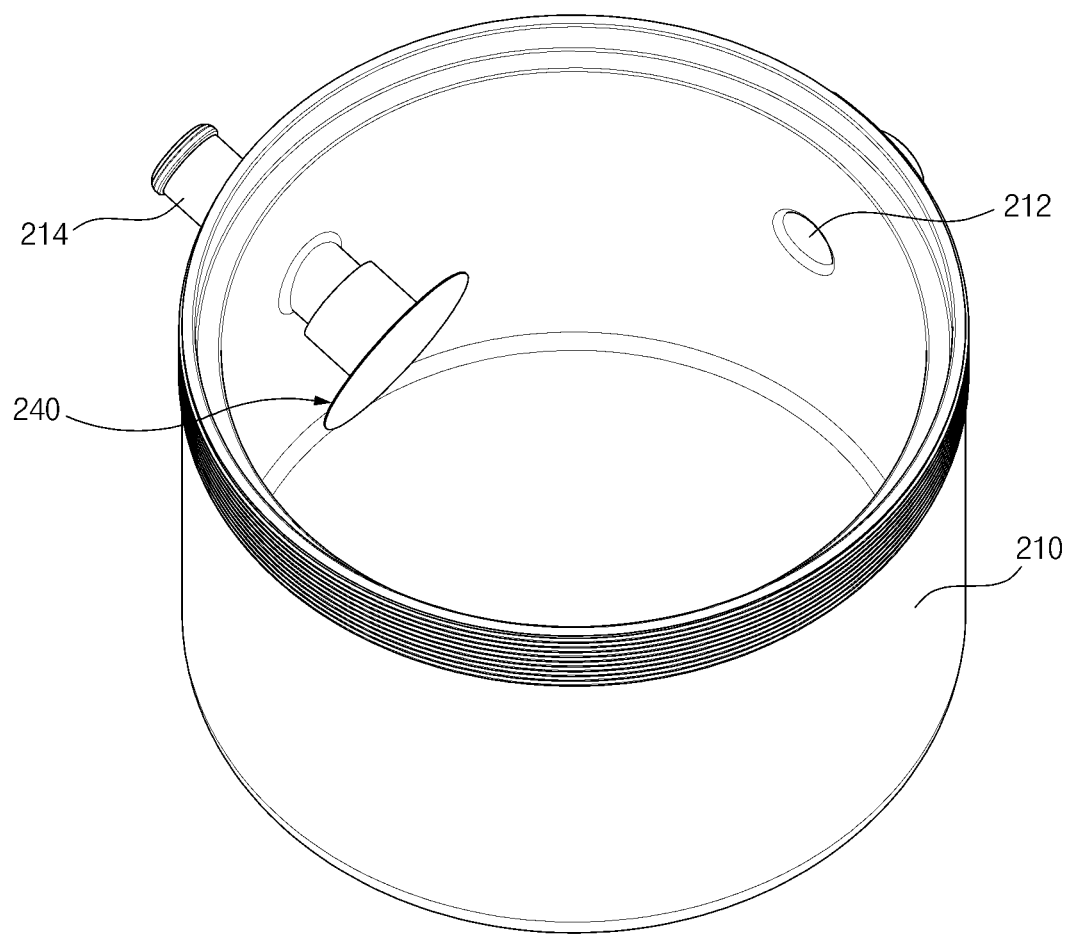
FIGS. 4 and 5 are views for explaining an opening/closing member of the fuel cell system according to the first embodiment of the present disclosure.

More specifically, referring to FIGS. 1 to 3, the storage container 200 includes a storage space configured to store the condensate water (e.g., condensate water produced in the fuel cell stack), the inlet port 212 through which the exhaust gas (treatment target gas) is introduced, and the outlet port 214 through which the exhaust gas is discharged. The condensate water contained in the exhaust gas may be stored in the storage container 200.

The storage container 200 may have various structures having the inlet port 212 and the outlet port 214. The present disclosure is not restricted or limited by the shape and structure of the storage container 200.

For example, the storage container 200 may include a container main body 210 having the storage space configured to store the condensate water, and a container cover 220 configured to cover the storage space.

The container main body 210 may be variously changed in shape and structure in accordance with required conditions and design specifications. The present disclosure is not restricted or limited by the shape and structure of the container main body 210. For example, the container main body 210 may have a cylindrical shape having a storage space opened at an upper side thereof.

For example, the inlet port 212 may be disposed at one side of a sidewall of the container main body 210. One end of the connection line configured to connect the humidifier 40 (exhaust gas discharge port) and the storage container 200 may be connected to the inlet port 212.

In addition, the outlet port 214 may be disposed at the other side of the sidewall of the container main body 210. The exhaust gas from which the condensate water is removed (trapped in the storage container) may be discharged to the outside of the storage container 200 through the outlet port 214.

The container cover 220 is disposed at an upper side of the container main body 210 and serves to cover the storage space. The container cover 220 may have a connection port (not illustrated), and the discharge member 300 may be connected to the connection port.

For example, a first screw thread portion (not illustrated) may be provided on an outer peripheral surface of the container main body 210, and a second screw thread portion (not illustrated) may be provided on an inner peripheral surface of the container cover 220 and screw-coupled to the first screw thread portion.

According to another example of the first embodiment of the present disclosure, instead of the first screw thread portion and the second screw thread portion, a locking protrusion may be provided on the container main body, and a locking groove, to which the locking protrusion may be locked, may be provided in the container cover.

In addition, in the first embodiment of the present disclosure illustrated and described above, the example has been described in which the inlet port 212 and the outlet port 214 are provided in the container main body 210. However, according to another example of the first embodiment of the present disclosure, at least any one of the inlet port 212 and the outlet port may be provided in the container cover. Alternatively, the discharge member may be connected to the container main body.

According to the first exemplary embodiment of the present disclosure, the fuel cell system 10 may include a first sealing member 230 configured to seal a portion between the container main body 210 and the container cover 220.

The first sealing member 230 serves to seal a gap between the container main body 210 and the container cover 220.

The first sealing member 230 may have various structures and be made of various materials in accordance with required conditions and design specifications. The present disclosure is not restricted or limited by the structure and material of the first sealing member 230.

For example, the first sealing member 230 may be made of an elastic material such as rubber, silicone, or urethane.

According to the first exemplary embodiment of the present disclosure, the first sealing member 230 may have an approximately ring shape having a diameter corresponding to the container main body 210. The first sealing member 230 may be pressed by the container cover 220 in a state in which the first sealing member 230 is seated on a seating portion (not illustrated) provided on the container main body 210.

According to another example of the first embodiment of the present disclosure, the first sealing member may be applied onto or formed, by injection molding, on the container main body (or the container cover).

Since the gap between the container main body 210 and the container cover 220 may be sealed in the state in which the first sealing member 230 is interposed between the container cover 220 and the container main body 210 as described above, it is possible to obtain an advantageous effect of minimizing a leak of the condensate water through the gap between the container main body 210 and the container cover 220.

The discharge member 300 serves to selectively discharge the condensate water to the outside of the storage container 200 depending on a supply pressure of the treatment target gas (exhaust gas) introduced into the storage container 200.

More specifically, one end of the discharge member 300 is immersed in the condensate water in the storage container 200, and the other end of the discharge member 300 is exposed to the outside of the storage container 200.

The discharge member 300 may have various structures capable of discharging the condensate water collected in the storage container 200 to the outside of the storage container 200. The present disclosure is not restricted or limited by the structure and shape of the discharge member 300.

For example, a pipe or tube having an approximately "I" shape may be used as the discharge member 300. One end (lower end based on FIG. 6) of the discharge member 300 may be immersed in the condensate water in the storage container 200, and the other end (upper end based on FIG. 6) of the discharge member 300 may be exposed to the outside of the storage container 200.

Figure 8:
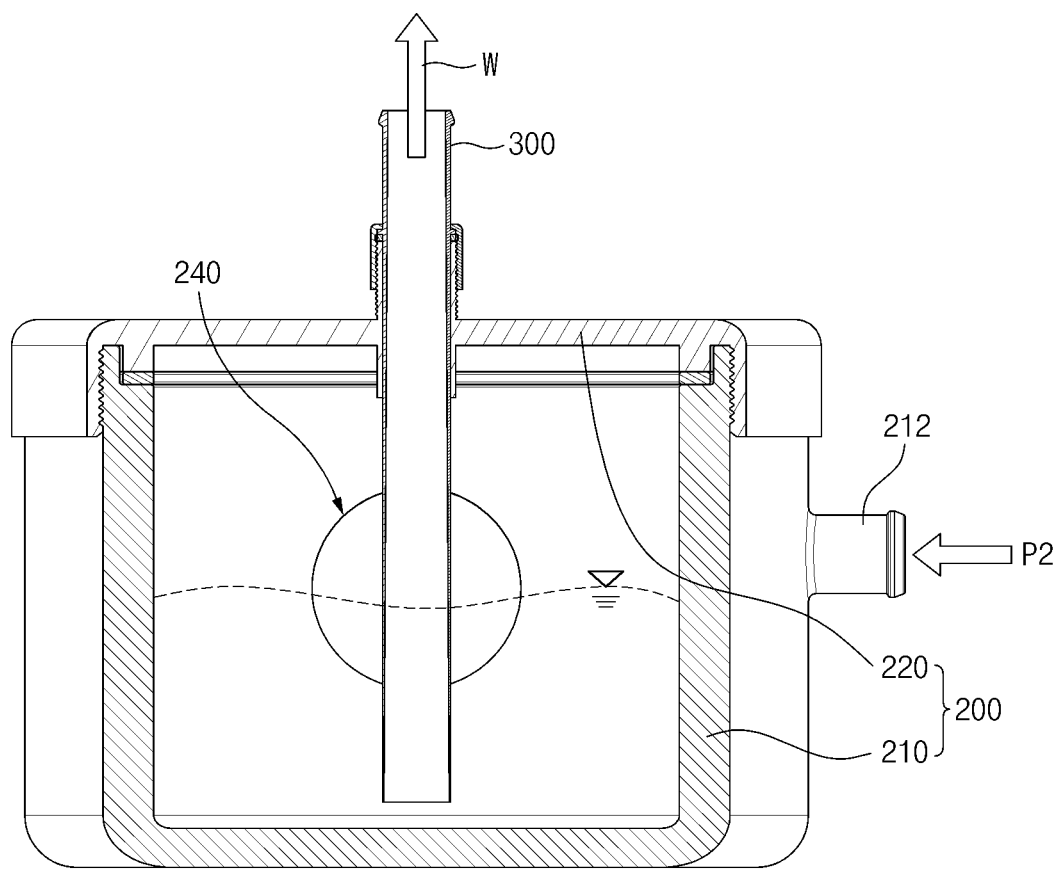

Since one end of the discharge member 300 is immersed in the condensate water and the other end of the discharge member 300 is exposed to the outside of the storage container 200 as described above, the condensate water W stored in the storage container 200 may be discharged to the outside of the storage container 200 through the discharge member 300, as illustrated in FIG. 8, when an internal pressure of the storage container 200 is raised to a predetermined pressure (a supply pressure of the exhaust gas supplied to the storage container is raised).

According to another example of the first embodiment of the present disclosure, the discharge member may have a curved shape (e.g., arc shape) or a bent shape such as an "L" shape.

In particular, one end (inlet end) (lower end based on FIG. 6) of the discharge member 300 may have a first cross-sectional area, and the other end (outlet end) (upper end based on FIG. 6) of the discharge member 300 may have a second cross-sectional area smaller than the first cross-sectional area.

This is based on the fact that when a cross-sectional area of the outlet end of the discharge member 300 is smaller than a cross-sectional area of the inlet end of the discharge member 300, a speed (discharge speed) of the condensate water at the outlet end of the discharge member 300 increases, and a pressure at the outlet end of the discharge member 300 decreases. Therefore, since the outlet end of the discharge member 300 has a smaller cross-sectional area than the inlet end of the discharge member 300, a pressure at the outlet end of the discharge member 300 may decrease. Therefore, it is possible to obtain an advantageous effect of further improving efficiency in discharging the condensate water through the discharge member 300.

In particular, a cross-sectional area of the discharge member 300 may gradually decrease in a direction from one end (inlet end) (lower end based on FIG. 6) of the discharge member 300 to the other end (outlet end) (upper end based on FIG. 6) of the discharge member 300.

According to the first exemplary embodiment of the present disclosure, the fuel cell system 10 may include a fixing member 310 configured to fix the discharge member 300 to the container cover 220.

The fixing member 310 may fix the discharge member 300 in various ways in accordance with required conditions and design specifications. The present disclosure is not restricted or limited by the structure and fixing method of the fixing member 310.

For example, the fixing member 310 may be screw-coupled to the connection port of the container main body 210 while surrounding the discharge member 300.

According to the first exemplary embodiment of the present disclosure, the fuel cell system 10 may include a second sealing member 320 configured to seal a portion between the fixing member 310 and the discharge member 300.

The second sealing member 320 serves to seal a gap between the fixing member 310 and the discharge member 300 (a gap between the container main body and the discharge member).

The second sealing member 320 may have various structures and be made of various materials in accordance with required conditions and design specifications. The present disclosure is not restricted or limited by the structure and material of the second sealing member 320.

For example, the second sealing member 320 may be made of an elastic material such as rubber, silicone, or urethane.

According to the first exemplary embodiment of the present disclosure, the second sealing member 320 may have an approximately ring shape having a diameter corresponding to the discharge member 300. The second sealing member 320 may be pressed by the fixing member 310 in a state in which the second sealing member 320 is seated on a seating surface (not illustrated) provided on the container main body 210.

According to another example of the first embodiment of the present disclosure, the second sealing member may be applied onto or formed, by injection molding, on the container main body (or the discharge member).

Since the gap between the fixing member 310 and the discharge member 300 may be sealed in a state in which the second sealing member 320 is interposed between the fixing member 310 and the discharge member 300 as described above, it is possible to obtain an advantageous effect of minimizing a leak of the condensate water through the gap between the fixing member 310 and the discharge member 300.

According to the first exemplary embodiment of the present disclosure, the fuel cell system 10 may include an opening/closing member 240 configured to selectively open or close the outlet port 214. When the supply pressure of the treatment target gas (exhaust gas) is higher than a preset reference pressure, the opening/closing member 240 may close the outlet port 214, and the condensate water may be discharged to the outside through the discharge member 300.

The opening/closing member 240 serves to close the outlet port 214 at the time of discharging the condensate water.

That is, the outlet port 214 may be opened at the time of discharging the condensate water, but the exhaust gas may be discharged to the outside through the outlet port 214 in the state in which the outlet port 214 is opened. For this reason, it is difficult to maintain a sufficient internal pressure of the storage container 200 (a pressure that may discharge the condensate water to the outside of the storage container 200).

However, according to the first embodiment of the present disclosure, the opening/closing member 240 configured to selectively open or close the outlet port 214 is provided, and the opening/closing member 240 closes the outlet port 214 when the supply pressure of the exhaust gas is higher than the preset reference pressure. Therefore, at a point in time at which the condensate water is discharged, the internal pressure of the storage container 200 may be maintained as a high pressure sufficient enough to discharge the condensate water.

The opening/closing member 240 may have various structures capable of selectively opening or closing the outlet port 214. The present disclosure is not restricted or limited by the structure of the opening/closing member 240.

Figure 5:
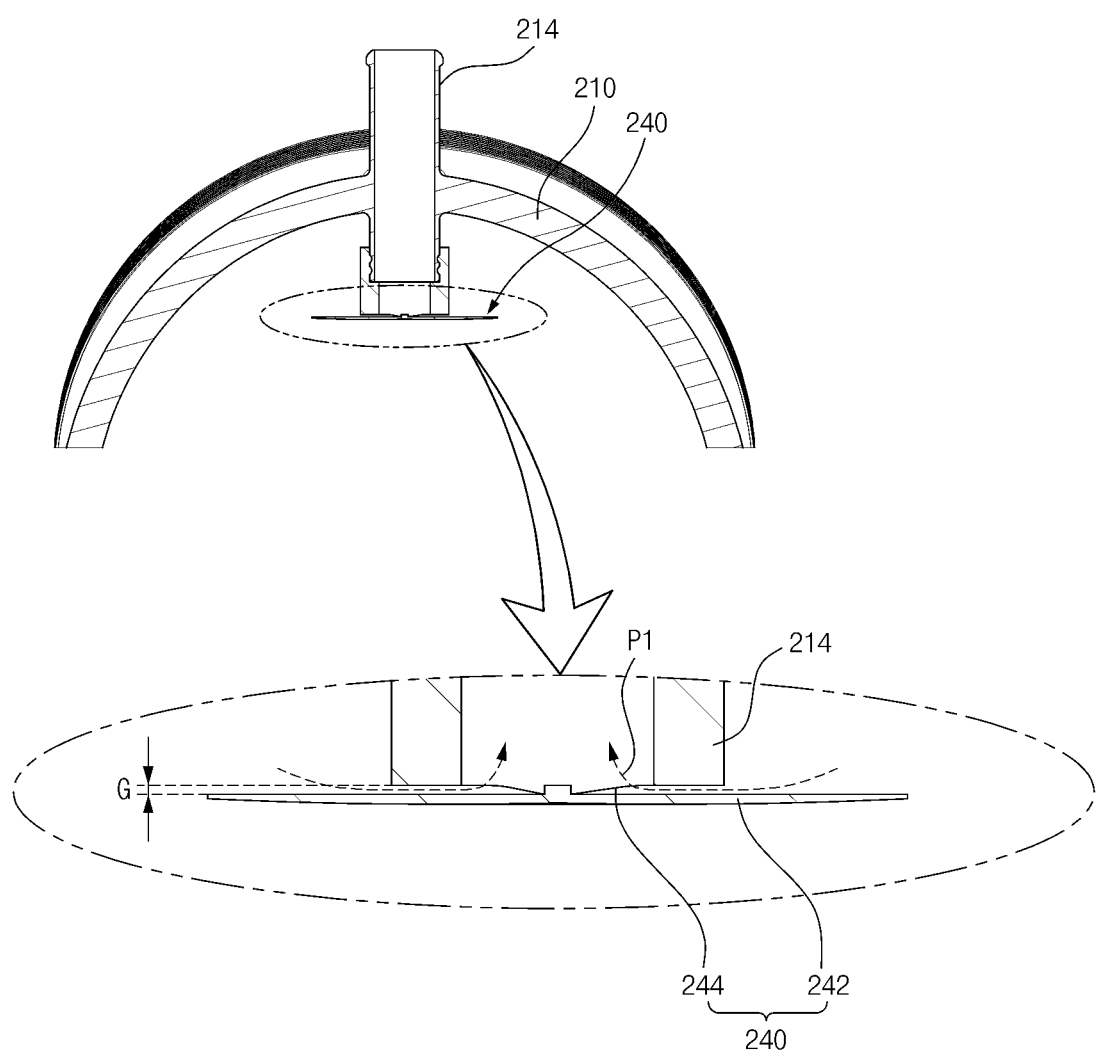
Figure 6:
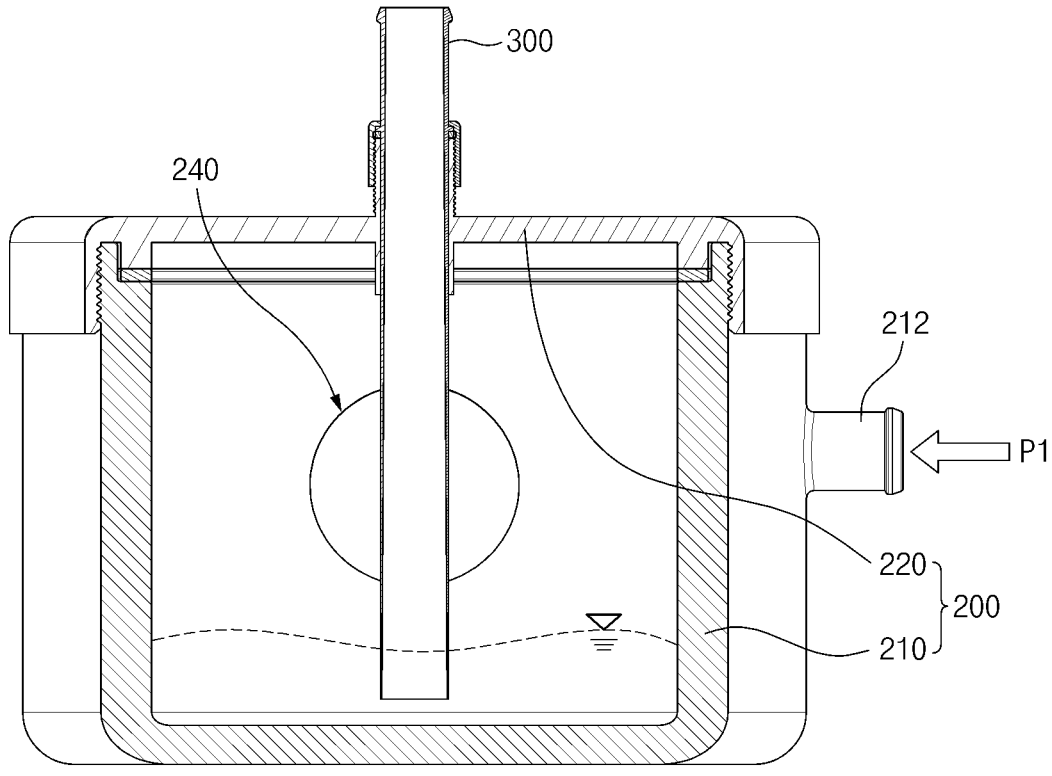
FIG. 6 is a view for explaining a state in which condensate water is stored in the fuel cell system according to the first embodiment of the present disclosure.

For example, the opening/closing member 240 may include: a valve seat 242 configured to be movable in a direction toward or away from the outlet port 214 (an inlet end of the outlet port), i.e., an upward/downward direction based on FIG. 5; and a support part 244 configured to elastically support a movement of the valve seat 242 relative to the storage container 200.

For example, the valve seat 242 may have a larger cross-sectional area than the inlet of the outlet port 214. Hereinafter, an example will be described in which the valve seat 242 has an approximately circular plate shape.

The support part 244 elastically connects the outlet port 214 and the valve seat 242. The support part 244 may selectively define a gap G between the outlet port 214 and the valve seat 242, and the exhaust gas may pass through the gap G.

More specifically, the support part 244 may be made of a material (e.g., rubber, silicone, urethane, etc.) having elasticity. One end of the support part 244 may be connected to one surface (upper surface based on FIG. 5) of the valve seat 242, and the other end of the support part 244 may be connected to the outlet port 214.

Referring to FIG. 5, when the supply pressure of the exhaust gas introduced into the storage container 200 is lower than the preset reference pressure, the gap G, through which the exhaust gas may pass, may be maintained (open position) between the outlet port 214 and the valve seat 242 by an elastic force of the support part 244, and the exhaust gas may be discharged to the outside through the gap G via the outlet port 214.

Figure 9:
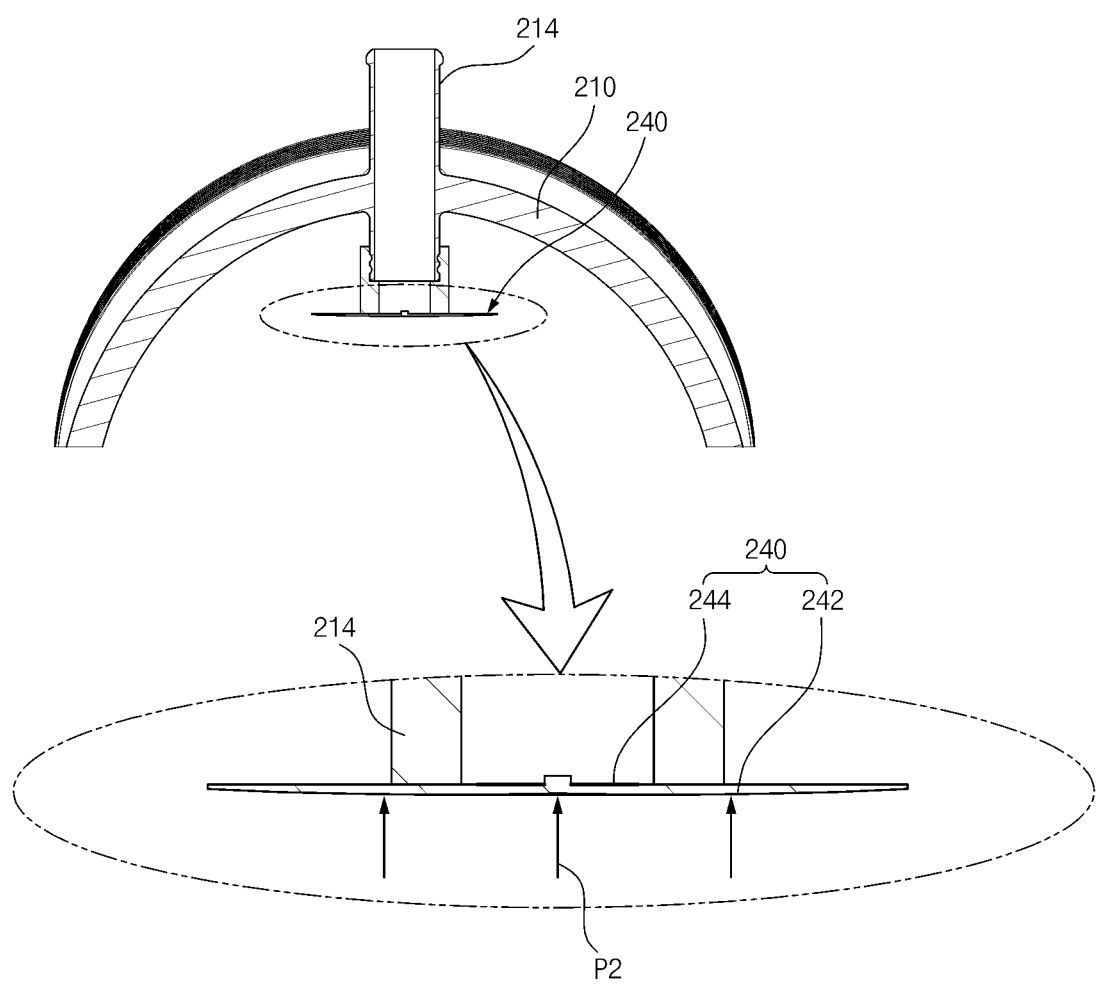
FIG. 9 is a view for explaining an operational structure of the opening/closing member of the fuel cell system according to the first embodiment of the present disclosure when condensate water is discharged.

In contrast, referring to FIG. 9, when the supply pressure of the exhaust gas is higher than the preset reference pressure, the support part 244 may be elastically deformed (compressed) by a pressure P2 applied to the valve seat 242, and the valve seat 242 may move in the direction toward the outlet port 214 (closed position). As the valve seat 242 moves in the direction toward the outlet port 214, the valve seat 242 comes into contact with the outlet port 214, such that the outlet port 214 may be closed.

Meanwhile, when the supply pressure of the exhaust gas becomes lower than the reference pressure, the valve seat 242 may be returned by the elastic force of the support part 244 to an initial position at which the valve seat 242 is spaced apart from the outlet port 214 (the open position at which the gap is formed).

In the first embodiment of the present disclosure illustrated and described above, the example has been described in which the valve seat 242 is elastically supported by the support part 244. However, according to another example of the first embodiment of the present disclosure, the valve seat may be configured to open or close the outlet port by being rectilinearly moved by a driving source such as a solenoid or hydraulic cylinder (or a pneumatic cylinder).

Figure 7:
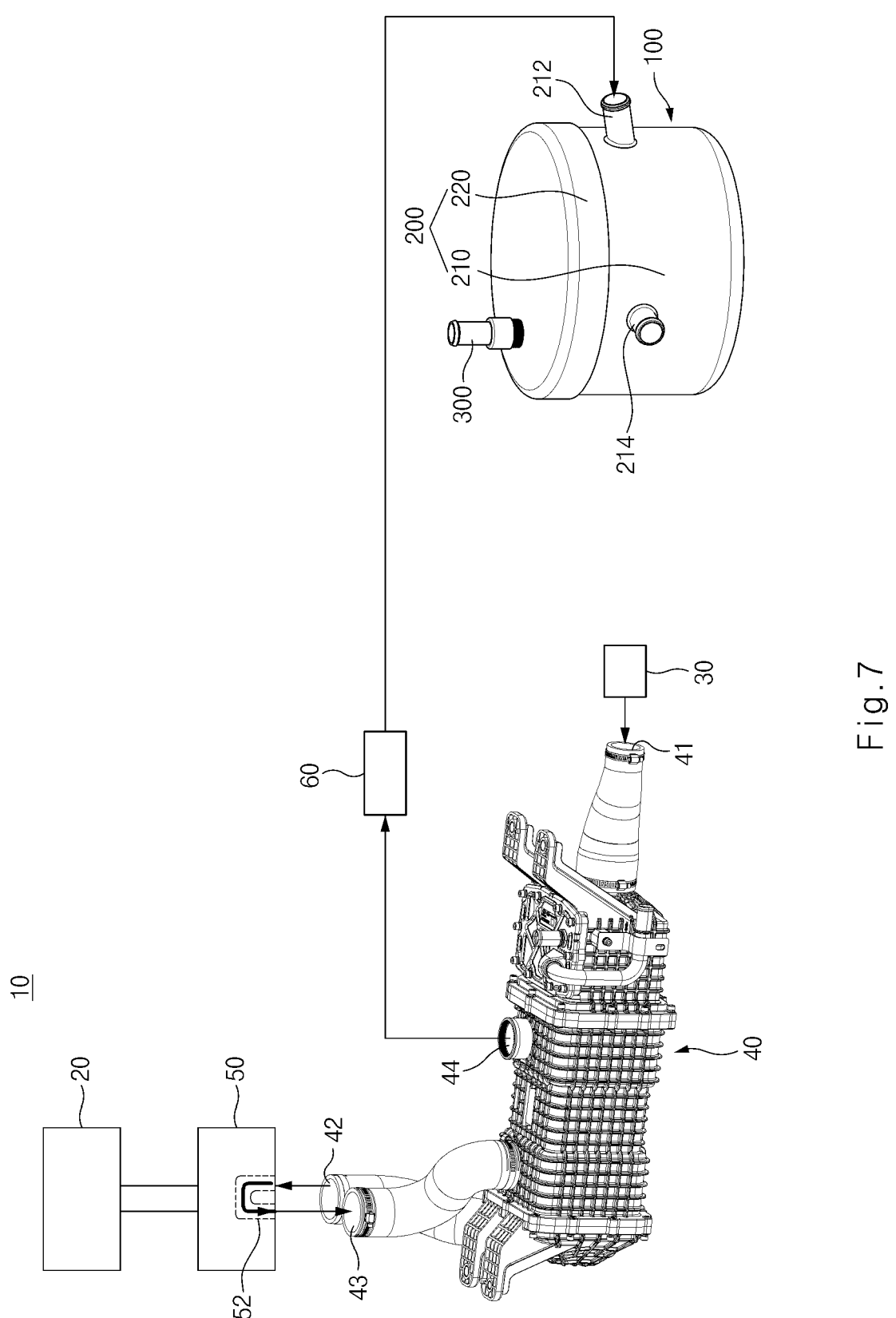
FIGS. 7 and 8 are views for explaining a state in which condensate water is discharged from the fuel cell system according to the first embodiment of the present disclosure.

Referring to FIGS. 7 to 9, according to the first exemplary embodiment of the present disclosure, the compressor 30 may adjust the supply pressure of the exhaust gas (treatment target gas) supplied to the storage container 200.

For example, at a point in time at which the condensate water stored in the storage container 200 needs to be discharged, the compressor 30 may be controlled in a supercharging operation mode so that the inflow gas (air) is supplied at a supercharging flow rate higher than the current supply flow rate.

More specifically, at the point in time at which the condensate water needs to be discharged, the compressor 30 is controlled so that an output of the compressor 30 (e.g., a rotational speed of an impeller) is higher than a reference output, which makes it possible to increase a supply flow rate and pressure of the inflow gas to be supplied to the fuel cell stack 20. The supply pressure of the exhaust gas to be supplied to the storage container 200 may be increased by increasing the pressure of the exhaust gas to be discharged from the fuel cell stack 20 as described above. Therefore, the condensate water stored in the storage container 200 may be discharged to the outside through the discharge member 300 by the internal pressure of the storage container 200.

For example, the operation (supercharging operation) of the compressor 30 may be controlled on the basis of a water level of the condensate water stored in the container main body 210. For example, when it is detected that the water level of the condensate water exceeds a preset reference water level, the operation mode of the compressor 30 may be switched from a normal operation mode to the supercharging operation mode.

In contrast, when the discharge of the condensate water is completed, the compressor 30 may be controlled so that the output of the compressor 30 decreases (the output of the compressor 30 returns to the reference output corresponding to the normal operation mode).

According to the first exemplary embodiment of the present disclosure, the fuel cell system 10 may include an air control valve 50 disposed between the humidifier 40 and the fuel cell stack 20 and including a bypass flow path that selectively allows the inflow gas, which is to be introduced into the fuel cell stack 20, to flow to the humidifier 40.

The air control valve 50 serves to control the air (inflow gas) to be introduced into the fuel cell stack 20 and the air (exhaust gas) discharged from the fuel cell stack 20.

More specifically, referring to FIG. 7, the air control valve 50 may include: a first air flow path (not illustrated) through which air is supplied to the fuel cell stack 20; a second air flow path (not illustrated) through which air is discharged from the fuel cell stack 20; and a bypass flow path 52 configured to selectively allow the air introduced into the first air flow path to flow to the second air flow path.

For example, a valve member (e.g., valve disc) (not illustrated) may open the first air flow path and the second air flow path of the air control valve 50 when the vehicle operates. The valve member may close the first air flow path and the second air flow path when the vehicle does not operate.

In addition, in the state in which the first air flow path and the second air flow path are closed (the vehicle does not operate), the compressor 30 may operate (in the supercharging operation mode) for a predetermined time to discharge the condensate water stored in the storage container 200. In this case, the air, which is introduced into the first air flow path by the compressor 30, may flow to the second air flow path through the bypass flow path 52 without being supplied to the fuel cell stack 20. Then, the air may be supplied to the storage container 200 via the humidifier 40.

As described above, according to the first embodiment of the present disclosure, the condensate water stored in the storage container 200 is discharged by adjusting the supply pressure of the exhaust gas (treatment target gas) to be supplied to the storage container 200 by the compressor 30. In this process, the high-pressure air made by the compressor 30 is supplied to the storage container 200 after passing through the humidifier 40 without being supplied directly to the storage container 200. Therefore, it is possible to obtain an advantageous effect of ensuring the discharge of the condensate water, minimizing the condensate water remaining in the humidifier 40, and minimizing the freezing of the condensate water in the humidifier 40.

That is, in the winter season with a low atmospheric temperature, the condensate water remaining in the humidifier 40 may be frozen, and the frozen condensate water may degrade the humidification performance of the humidifier 40. Therefore, it is necessary to minimize the amount of condensate water remaining in the humidifier 40.

Therefore, according to the present disclosure, the high-pressure air made by the compressor 30 is supplied to the storage container 200 after passing through the humidifier 40 when the compressor 30 operates to discharge the condensate water (to increase the supply pressure of the exhaust gas to be supplied to the storage container). Therefore, it is possible to obtain an advantageous effect of minimizing the amount of condensate water remaining in the humidifier 40 while ensuring the function of discharging the condensate water.

Referring to FIGS. 10 to 19, a condensate water storage device 1100 according to a second embodiment of the present disclosure includes: a storage container 1200 having a storage space 1210a configured to store condensate water, and a discharge hole 1211 configured to discharge the condensate water to the outside; and a valve unit 1300 configured to selectively open or close the discharge hole 1211. The valve unit 1300 includes: a valve member 1310 configured to be movable from a first position at which the valve member 1310 closes the discharge hole 1211 to a second position at which the valve member 1310 opens the discharge hole 1211; and a valve magnetic element 1320 disposed on the valve member 1310 and configured to generate an attractive force with a base magnetic element 2a disposed at a treatment target location 2 so that the valve member 1310 is moved to the second position by the attractive force between the valve magnetic element 1320 and the base magnetic element 2a.

For reference, the condensate water storage device 1100 according to the second embodiment of the present disclosure may be used to store condensate water produced from an object 1. The present disclosure is not restricted or limited by the type and structure of the object 1 to which the condensate water storage device 1100 is applied.

In particular, the condensate water storage device 1100 according to the second embodiment of the present disclosure may be used to temporarily store condensate water produced from a fuel cell system 10 applied to a construction machine (object) such as a forklift.

According to another example of the second embodiment of the present disclosure, the condensate water storage device 1100 may be applied to mobility vehicles such as various vehicles (e.g., passenger vehicles or commercial vehicles), ships, and aircrafts to which the fuel cell system 10 may be applied.

According to the second exemplary embodiment of the present disclosure, the fuel cell system 10 may include: a fuel cell stack 20; the storage container 1200 having the storage space 1210a configured to store the condensate water produced from the fuel cell stack 20, and the discharge hole 1211 configured to discharge the condensate water to the outside; and the valve unit 1300 configured to selectively open or close the discharge hole 1211. The valve unit 1300 may include: the valve member 1310 configured to be movable from the first position at which the valve member 1310 closes the discharge hole 1211 to the second position at which the valve member 1310 opens the discharge hole 1211; and the valve magnetic element 1320 disposed on the valve member 1310 and configured to generate the attractive force with the base magnetic element 2a disposed at the treatment target location 2 so that the valve member 1310 is moved to the second position by the attractive force between the valve magnetic element 1320 and the base magnetic element 2a.

The fuel cell stack 20 refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) (not illustrated) having catalyst electrode layers in which electrochemical reactions occur and which are attached to two opposite sides of an electrolyte membrane through which hydrogen ions move; a gas diffusion layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

According to the second exemplary embodiment of the present disclosure, the fuel cell system 10 may include a humidifier 30 configured to humidify inflow gas (dry air) by using moist air discharged from the fuel cell stack 20.

The humidifier 30 may have various structures capable of humidifying the inflow gas by using the moist air discharged from the fuel cell stack 20. The present disclosure is not restricted or limited by the type and structure of the humidifier 30.

For example, the humidifier 30 may include an inflow gas supply port 31 through which inflow gas is introduced (supplied), an inflow gas discharge port 32 through which the (humidified) inflow gas having passed through the interior of the humidifier 30 is discharged, a moist air supply port 33 through which moist air discharged from the fuel cell stack 20 is supplied, and a moist air discharge port 34 through which the moist air, which has humidified the inflow gas, is discharged to the outside.

The inflow gas supplied through the inflow gas supply port 31 may be humidified by the moist air while passing through a humidification membrane (e.g., a hollow fiber membrane) (not illustrated) disposed in the humidifier 30. Then, the humidified inflow gas may be supplied to the fuel cell stack 20 through the inflow gas discharge port 32.

Further, the moist air (or produced water) discharged from the fuel cell stack 20 may be supplied to the moist air supply port 33, humidify the inflow gas in the humidifier 30, and then be discharged to the outside of the humidifier 30 through the moist air discharge port 34.

According to the second exemplary embodiment of the present disclosure, the storage container 1200 serves to store the condensate water discharged to the outside of the humidifier 30 through the moist air discharge port 34.

In particular, a silencer 40 may be disposed on a connection line (not illustrated) that connects the humidifier 30 and the storage container 1200. The silencer 40 may serve to reduce discharge noise of exhaust gas discharged along the connection line.

In the second embodiment of the present disclosure illustrated and described above, the example has been described in which the condensate water produced from the fuel cell stack 20 is supplied to the storage container 1200 via the humidifier 30 and the silencer 40. However, according to another example of the second embodiment of the present disclosure, the condensate water produced from the fuel cell stack may be supplied directly to the storage container.

Figure 10:
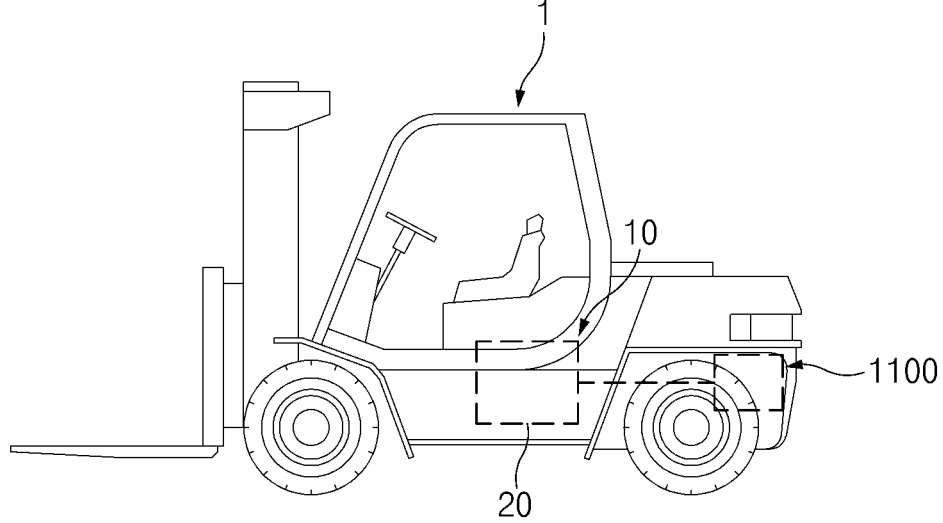
FIG. 10 is a view for explaining an application example of a fuel cell system according to a second embodiment of the present disclosure.
Figure 11:
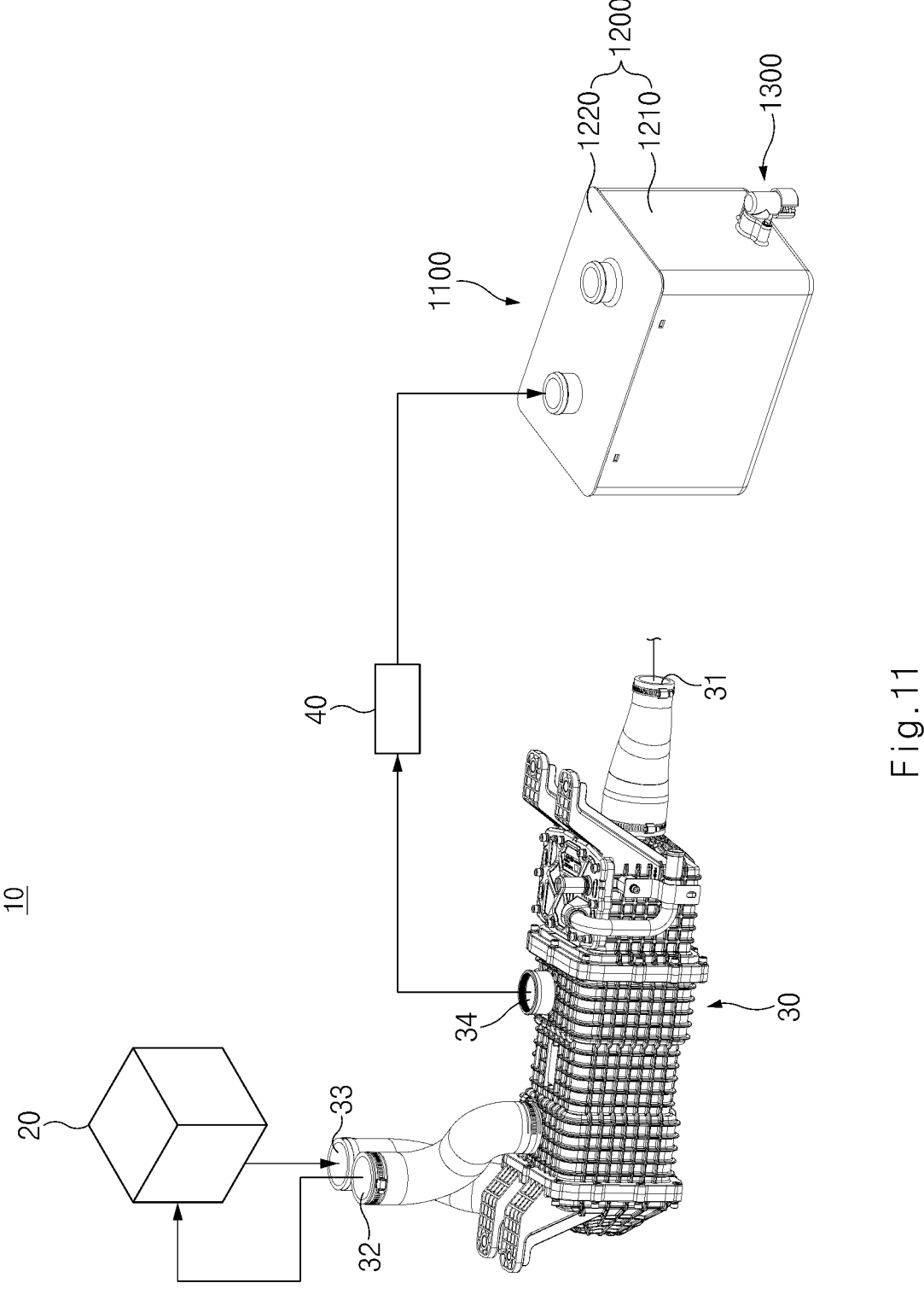
FIG. 11 is a view for explaining the fuel cell system according to the second embodiment of the present disclosure.
Figure 12:
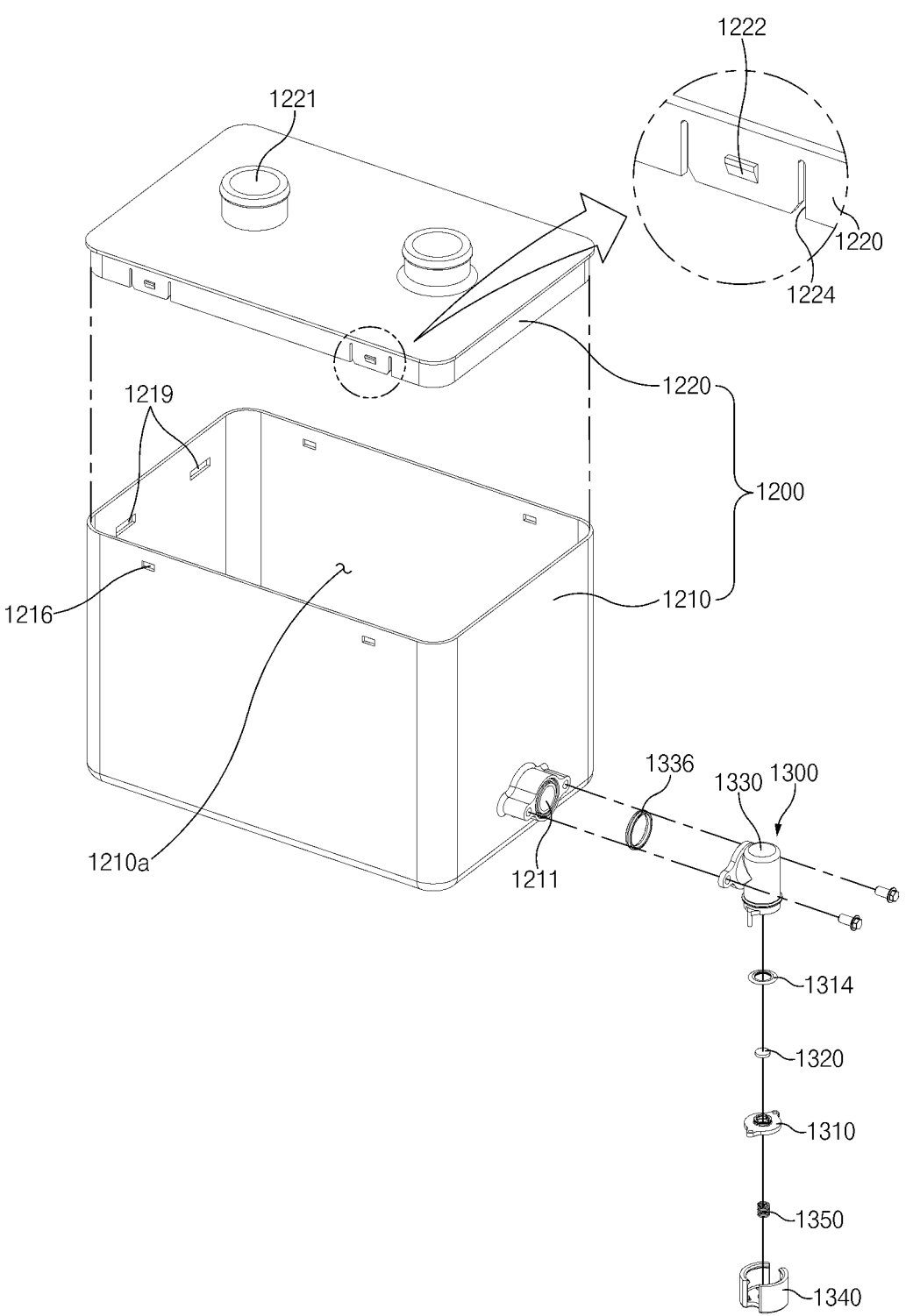
FIG. 12 is a view for explaining a condensate water storage device of the fuel cell system according to the second embodiment of the present disclosure.

Referring to FIGS. 10 to 12, the storage container 1200 has the storage space 1210a for storing the condensate water (e.g., the condensate water produced from the fuel cell stack), and the discharge hole 1211 for discharging the condensate water to the outside.

The storage container 1200 may have various structures having the storage space 1210a and the discharge hole 1211. The present disclosure is not restricted or limited by the shape and structure of the storage container 1200.

For example, the storage container 1200 may include a container main body 1210 having the storage space 1210a, and a container cover 1220 configured to cover the storage space 1210a.

The container main body 1210 may be variously changed in shape and structure in accordance with required conditions and design specifications. The present disclosure is not restricted or limited by the shape and structure of the container main body 1210. For example, the container main body 1210 may be provided in the form of a quadrangular box having the storage space 1210a opened at an upper side thereof.

For example, the discharge hole 1211 (e.g., the circular discharge hole) may be provided in a sidewall portion of the container main body 1210, and the condensate water stored in the storage space 1210a may be discharged to the outside of the storage container 1200 through the discharge hole 1211.

The container cover 1220 is disposed at an upper side of the container main body 1210 and serves to cover the storage space 1210a. The container cover 1220 may have an inlet port 1221, and one end of the connection line configured to connect the humidifier 30 (the moist air discharge port) and the storage container 1200 may be connected to the inlet port 1221.

According to another example of the second embodiment of the present disclosure, the discharge hole may be provided in a bottom portion of the container main body. In addition, according to still another example of the second embodiment of the present disclosure, two or more inlet ports may be provided in the container cover. Alternatively, the inlet port may be provided in the container main body instead of the container cover.

Figure 13:
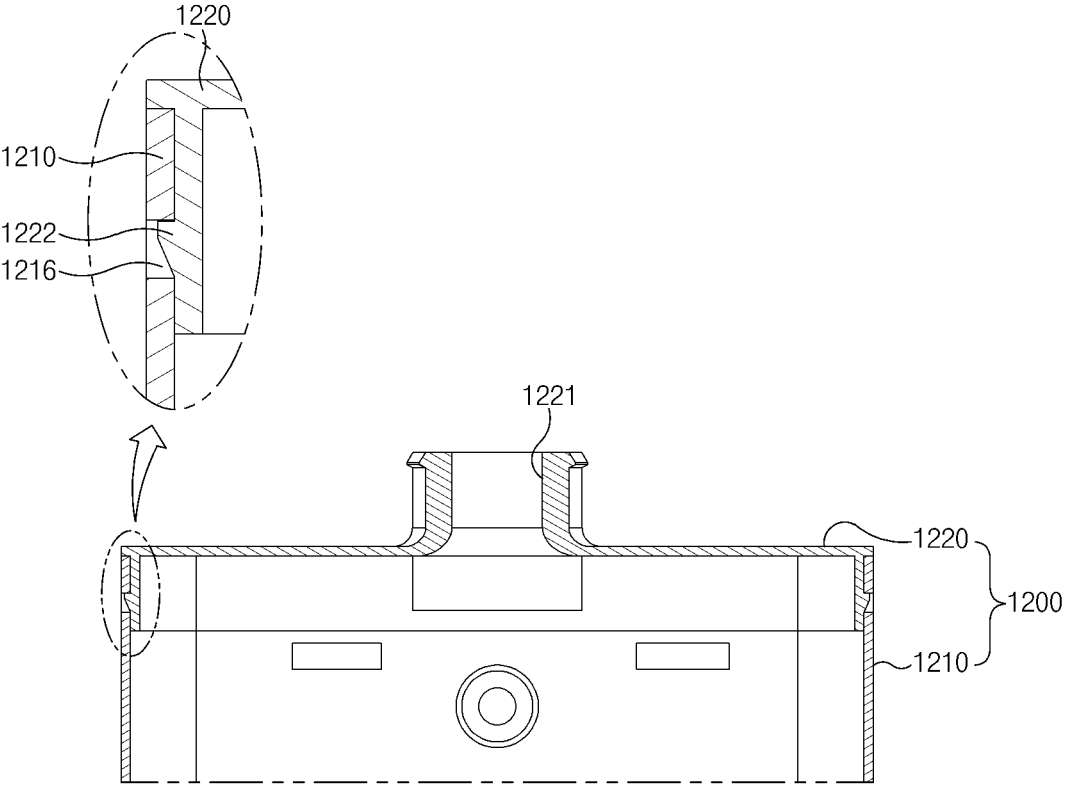
FIG. 13 is a view for explaining a storage container of the fuel cell system according to the second embodiment of the present disclosure.

Referring to FIGS. 12 and 13, according to the second exemplary embodiment of the present disclosure, the condensate water storage device 1100 may include locking grooves 1216 provided in the container main body 1210, locking protrusions 1222 provided on the container cover 1220 and configured to be locked to the locking grooves 1216, and cut-out slits 1224 provided in the container cover 1220 and disposed adjacent to the locking protrusions 1222.

The locking protrusion 1222 may have various structures capable of being locked to the locking groove 1216. The present disclosure is not restricted or limited by the structure of the locking protrusion 1222.

For example, when the container cover 1220 is coupled to an upper portion of the container main body 1210, the locking protrusions 1222 may be accommodated in the locking grooves 1216 and locked to inner wall surfaces of the locking grooves 1216.

Since the container cover 1220 and the container main body 1210 are locked to each other by means of the locking grooves 1216 and the locking protrusions 1222 as described above, it is possible to obtain an advantageous effect of stably maintaining the state in which the container cover 1220 is coupled to the container main body 1210.

In addition, one or more cut-out slits 1224 may be provided in the container cover 1220 and disposed adjacent to the locking protrusion 1222.

The cut-out slit 1224 may be made by partially removing (cutting) a part of the container cover 1220. The present disclosure is not restricted or limited by the shape and structure of the cut-out slit 1224.

For example, the cut-out slits 1224 may be provided in an upward/downward direction and disposed at two opposite left and right sides of the locking protrusion 1222 based on the locking protrusion 1222.

According to another example of the second embodiment of the present disclosure, the cut-out slit may be provided in a leftward/rightward direction or other directions based on the locking protrusion. Alternatively, the cut-out slit may have a curved shape such as an 'S' shape or a 'C' shape.

As described above, the cut-out slits 1224 may be provided at the periphery of the locking protrusion 1222, which makes it possible to improve the dynamic properties of the locking protrusion 1222 (the properties that allow the locking protrusion 1222 to freely move) relative to the container cover 1220 and make it easy to couple and separate the locking protrusion 1222 to and from the locking groove 1216.

Figure 14:
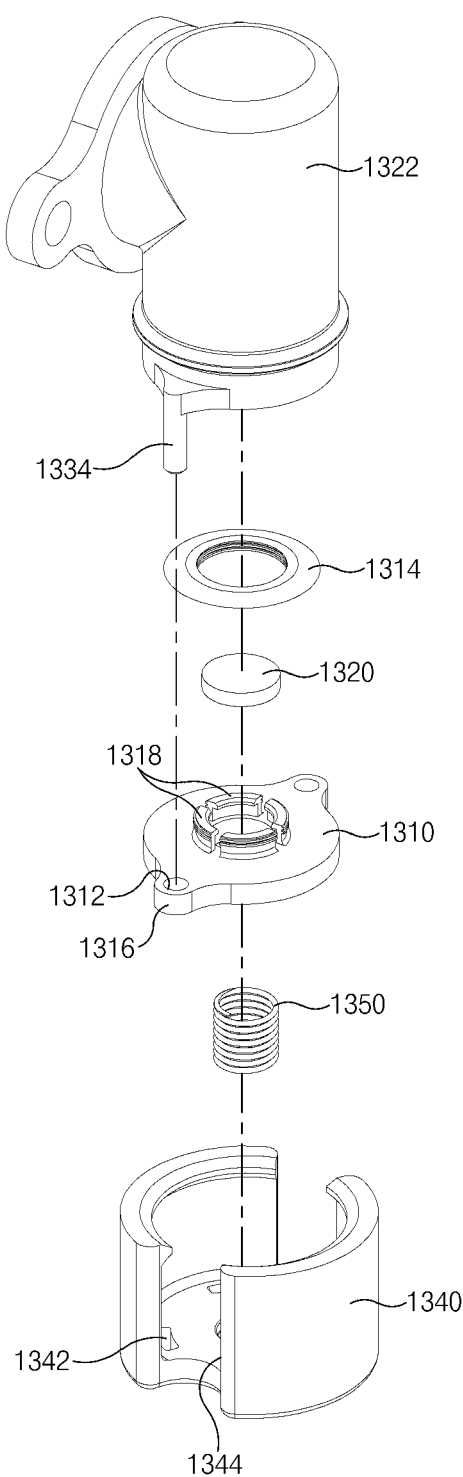
FIG. 14 is a view for explaining a valve unit of the fuel cell system according to the second embodiment of the present disclosure.
Figure 15:
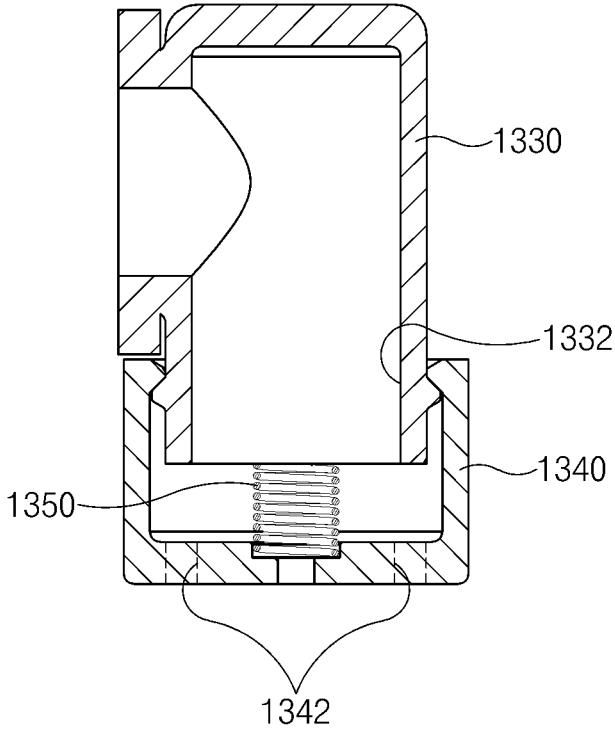
FIG. 15 is a view for explaining a valve housing of the fuel cell system according to the second embodiment of the present disclosure.
Figure 16:
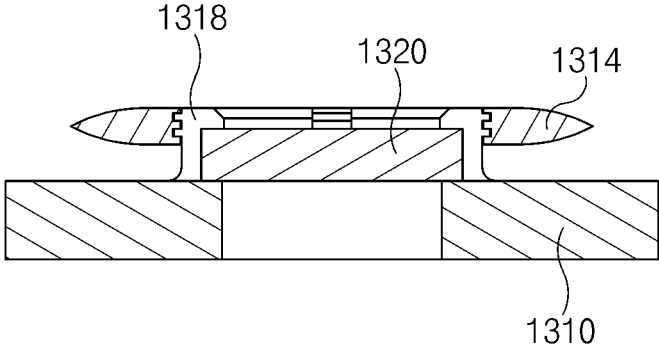
FIG. 16 is a view for explaining a valve member of the fuel cell system according to the second embodiment of the present disclosure.
Figure 19:
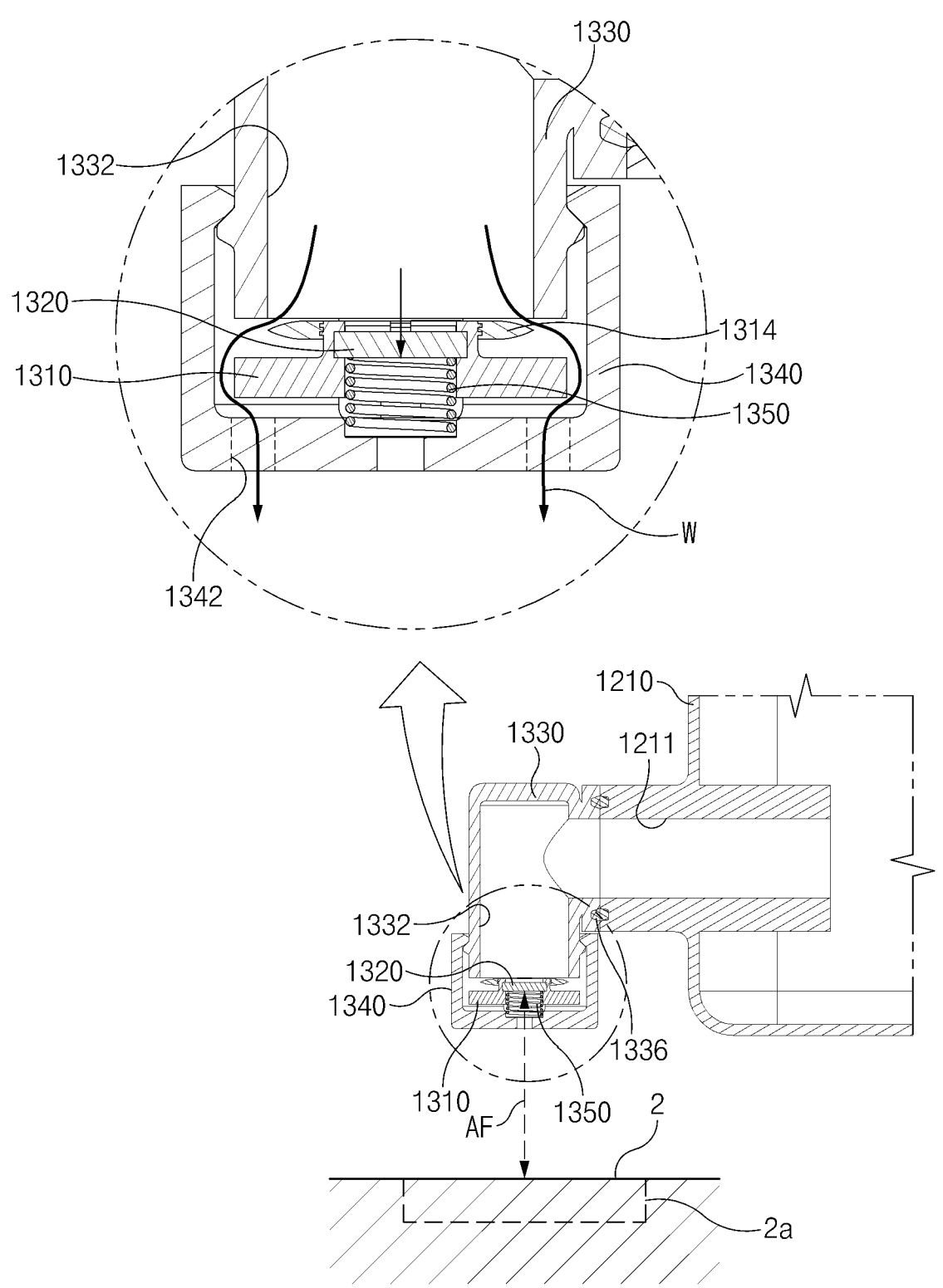

Referring to FIGS. 12, 14, and 19, the valve unit 1300 serves to selectively open or close the discharge hole 1211.

More specifically, the valve unit 1300 includes: the valve member 1310 configured to be movable from the first position at which the valve member 1310 closes the discharge hole 1211 to the second position at which the valve member 1310 opens the discharge hole 1211; and the valve magnetic element 1320 disposed on the valve member 1310 and configured to generate an attractive force (AF) with the base magnetic element 2a disposed at the treatment target location 2 so that the valve member 1310 is moved to the second position by the attractive force between the valve magnetic element 1320 and the base magnetic element 2a.

The valve unit 1300 may have various structures including the valve member 1310 and the valve magnetic element 1320. The present disclosure is not restricted or limited by the structure of the valve unit 1300.

The valve member 1310 is movable from the first position at which the valve member 1310 closes the discharge hole 1211 to the second position at which the valve member 1310 opens the discharge hole 1211.

In this case, the configuration in which the valve member 1310 is positioned at the first position means that the valve member 1310 is positioned to close the discharge hole 1211, and the configuration in which the valve member 1310 is positioned at the second position means that the valve member 1310 is positioned to open the discharge hole 1211.

The valve member 1310 may be configured to move from the first position to the second position in various ways in accordance with required conditions and design specifications.

For example, the valve member 1310 may rectilinearly move from the first position to the second position (or from the second position to the first position).

According to another example of the second embodiment of the present disclosure, the valve member may rotate from the first position to the second position or move along a curved movement route.

According to the second exemplary embodiment of the present disclosure, the valve unit 1300 may include a valve housing 1330 connected to the storage container 1200 and having a communication hole 1332 configured to communicate with the discharge hole 1211. The valve member 1310 may close the communication hole 1332 at the first position and open the communication hole 1332 at the second position.

The valve housing 1330 may have various structures having the communication hole 1332 that communicates with the discharge hole 1211. The present disclosure is not restricted or limited by the structure and shape of the valve housing 1330.

For example, the valve housing 1330 may have an approximately "L"-shaped cross-section and be coupled (e.g., fastened by bolting) to an outer surface of the container main body 1210. The communication hole 1332 may be formed in a shape corresponding to a shape of the valve housing 1330.

According to another example of the second embodiment of the present disclosure, the valve housing may have an "I"-shaped cross-section, a "C"-shaped cross-section, or other cross-sectional shapes.

According to the second exemplary embodiment of the present disclosure, the condensate water storage device 1100 may include a housing sealing member 1336 interposed between the storage container 1200 and the valve housing 1330.

The housing sealing member 1336 serves to seal a gap between the storage container 1200 and the valve housing 1330.

The housing sealing member 1336 may be made of various materials and have various structures capable of sealing the gap between the storage container 1200 and the valve housing 1330. The present disclosure is not restricted or limited by the structure and material of the housing sealing member 1336.

For example, the housing sealing member 1336 may be made of an elastic material such as rubber, silicone, or urethane. The housing sealing member 1336 may be provided in the form of an approximately circular ring and interposed between the storage container 1200 and the valve housing 1330.

According to another example of the second embodiment of the present disclosure, the housing sealing member may be integrated with the valve housing by double injection molding.

Since the housing sealing member 1336 is disposed between the storage container 1200 and the valve housing 1330 as described above, it is possible to obtain an advantageous effect of minimizing a leak of the condensate water through the gap between the storage container 1200 and the valve housing 1330.

The valve member 1310 serves to open or close the communication hole 1332 (an outlet end of the communication hole) while rectilinearly moving (rectilinearly moving in the upward/downward direction based on FIG. 14) relative to the valve housing 1330.

The valve member 1310 may have various structures capable of opening or closing the communication hole 1332. The present disclosure is not restricted or limited by the structure and shape of the valve member 1310.

For example, the valve member 1310 may be provided in the form of an approximately circular plate having a larger diameter than the communication hole 1332.

The valve member 1310 may close the communication hole 1332 in a state in which the valve member 1310 is in close contact with a lower end of the valve housing 1330 (the first position). The valve member 1310 may open the communication hole 1332 in a state in which the valve member 1310 is spaced apart from the lower end of the valve housing 1330 (the second position).

For reference, in the second embodiment of the present disclosure illustrated and described above, the example has been described in which the valve member 1310 opens or closes the communication hole 1332 that communicates with the discharge hole 1211. However, according to another example of the second embodiment of the present disclosure, the valve member may be configured to directly open or close the discharge hole without a separate valve housing.

The rectilinear movement of the valve member 1310 relative to the valve housing 1330 may be performed in various ways in accordance with required conditions and design specifications.

For example, the condensate water storage device 1100 may include: guide rods 1334 disposed on the valve housing 1330; and guide holes 1312 provided in the valve member 1310 and configured to accommodate the guide rods 1334 so that the valve member 1310 is rectilinearly movable along the guide rods 1334.

As described above, the valve member 1310 rectilinearly moves along the guide rods 1334 in the state in which the guide rods 1334 are inserted into the guide holes 1312. Therefore, it is possible to obtain an advantageous effect of minimizing the separation and torsion of the valve member 1310 when the valve member 1310 rectilinearly moves relative to the valve housing 1330. Further, it is possible to obtain an advantageous effect of stably supporting the rectilinear movement of the valve member 1310 relative to the valve housing 1330.

According to another example of the second embodiment of the present disclosure, a guide structure, which is similar to the guide rod, may be disposed on the storage container or the peripheral component adjacent to the storage container, and the valve member may rectilinearly move along the guide structure.

According to the second exemplary embodiment of the present disclosure, the condensate water storage device 1100 may include a valve sealing member 1314 configured to seal a portion between the valve member 1310 and the valve housing 1330.

The valve sealing member 1314 serves to seal a gap between the valve member 1310 and the valve housing 1330.

The valve sealing member 1314 may be made of various materials and have various structures capable of sealing the gap between the valve member 1310 and the valve housing 1330. The present disclosure is not restricted or limited by the structure and material of the valve sealing member 1314.

For example, the valve sealing member 1314 may be made of an elastic material such as rubber, silicone, or urethane. The valve sealing member 1314 may be provided in the form of a ring having a diameter (outer diameter) corresponding to a diameter of the communication hole 1332 and assembled to the valve member 1310.

For example, a fastening groove (not illustrated) may be provided in an inner peripheral surface of the valve sealing member 1314, and a fastening protrusion (not illustrated)

may be provided on the valve member 1310 and accommodated in the fastening groove.

According to another example of the second embodiment of the present disclosure, the valve sealing member may be integrated with the valve member by double injection molding. Alternatively, the valve sealing member may be attached (bonded) to the valve member.

In the state in which the valve member 1310 is in close contact with the valve housing 1330, the valve sealing member 1314 is accommodated in the communication hole 1332 (in close contact with an inner peripheral surface of the communication hole), such that the valve sealing member 1314 may seal the gap between the valve member 1310 and the valve housing 1330. In the state in which the valve member 1310 is separated from the valve housing 1330, the valve sealing member 1314 may be withdrawn to the outside of the communication hole 1332.

Since the valve sealing member 1314 is disposed between the valve member 1310 and the valve housing 1330 as described above, it is possible to obtain an advantageous effect of minimizing a leak of the condensate water through the gap between the valve member 1310 and the valve housing 1330 in the state in which the valve member 1310 is in close contact with the valve housing 1330.

The valve magnetic element 1320 serves to selectively move the valve member 1310 by using the attractive force between the valve magnetic element 1320 and the base magnetic element 2a disposed at the preset treatment target location 2.

That is, the valve magnetic element 1320 is disposed on the valve member 1310 and generates the attractive force with the base magnetic element 2a disposed at the treatment target location 2. When the attractive force is applied between the valve magnetic element 1320 and the base magnetic element 2a, the valve member 1310 may be moved to the second position at which the valve member 1310 opens the discharge hole 1211 (communication hole).

For example, the base magnetic element 2a may be embedded in a floor of the preset treatment target location 2. When the object 1 is positioned at the treatment target location 2, the attractive force may be applied between the valve magnetic element 1320 and the base magnetic element 2a. According to another example of the second embodiment of the present disclosure, the base magnetic element may protrude from the floor of the treatment target location.

The base magnetic element 2a and the valve magnetic element 1320 may each be configured as a typical magnetic element capable of generating the attractive force. The present disclosure is not restricted or limited by the types and properties of the base magnetic element 2a and the valve magnetic element 1320.

For example, the base magnetic element 2a may be configured as a permanent magnet having a circular plate shape. The valve magnetic element 1320 may be made of metal (e.g., steel) that may be attached to the permanent magnet.

According to another example of the second embodiment of the present disclosure, the valve magnetic element may be configured as a permanent magnet having a polarity opposite to the polarity of the base magnetic element. Alternatively, one or both of the base magnetic element and the valve magnetic element may be configured as an electromagnet that is magnetized when electric current flows.

As described above, according to the second embodiment of the present disclosure, the valve magnetic element 1320 is disposed on the valve member 1310, and the attractive force is applied between the valve magnetic element 1320 and the base magnetic element 2a when the object 1 is positioned at the treatment target location 2 (the valve magnetic element is moved to the position at which the valve magnetic element and the base magnetic element may generate the attractive force). Further, the attractive force moves the valve member 1310 to the second position at which the valve member 1310 opens the discharge hole 1211. Therefore, as the object 1 is only moved to the treatment target location 2, the condensate water stored in the storage container 1200 may be easily discharged at the treatment target location 2 even though an operator does not perform a separate operation of opening the discharge hole 1211.

Moreover, a device (or an operating means) for opening the discharge hole 1211 need not be separately provided. Therefore, it is possible to obtain an advantageous effect of simplifying the structure and improving the degree of design freedom and spatial utilization.

In particular, the treatment target location 2 may have a drain line (not illustrated) or a drain port through which the condensate water discharged from the storage container 1200 is discharged.

The structure for coupling the valve member 1310 and the valve magnetic element 1320 may be variously changed in accordance with required conditions and design specifications.

For example, the condensate water storage device 1100 may include support protrusions 1318 disposed on the valve member 1310 and configured to support the valve magnetic element 1320 on the valve member 1310.

The support protrusion 1318 may have various structures capable of locking (supporting) the valve magnetic element 1320. For example, a plurality of support protrusions 1318 may be disposed on an upper surface of the valve member 1310 and spaced apart from one another. The plurality of support protrusions 1318 collectively defines an approximately ring shape. The plurality of support protrusions 1318 may collectively support a periphery of the valve magnetic element 1320.

In particular, one end (lower end based on FIG. 14) of the support protrusion 1318 may be fixed to the valve member 1310, and the other end (upper end based on FIG. 14) of the support protrusion 1318 may be disposed as a free end. Therefore, the support protrusion 1318 may elastically move with respect to one end of the support protrusion 1318 relative to the valve member 1310. Therefore, the valve magnetic element 1320 may be elastically fastened to the support protrusions 1318 by snap-fit fastening.

More particularly, the support protrusion 1318 may have an approximately "L"-shaped cross-section and lock both a lateral surface (outer peripheral surface) and an upper surface of the valve magnetic element 1320.

According to another example of the second embodiment of the present disclosure, the valve member may have a sliding coupling groove, and the valve magnetic element may be slidingly coupled to the sliding coupling groove. Alternatively, the valve magnetic element may be fastened to the valve member by means of a separate fastening member.

According to the second exemplary embodiment of the present disclosure, the condensate water storage device 1100 may include a valve cover 1340 connected to the valve housing 1330, configured to surround the valve member 1310, and having discharge flow paths 1342 that communicate with the communication hole 1332.

Since the valve cover is provided as described above, it is possible to obtain an advantageous effect of minimizing contamination of and damage to the valve member 1310 and further improving driving stability of the valve member 1310.

For example, the valve cover 1340 may be provided in the form of a cup opened at an upper side thereof and coupled to surround a periphery of the lower end of the valve housing 1330. The valve member 1310 may be accommodated in the valve cover 1340 and moved in the upward/downward direction (based on FIG. 14).

The discharge flow paths 1342 may be provided at a lower end of the valve cover 1340. The condensate water discharged through the communication hole 1332 may be discharged to the outside via the discharge flow paths 1342.

The discharge flow path 1342 may have various structures capable of discharging the condensate water to the outside of the valve cover 1340. The present disclosure is not restricted or limited by the structure and shape of the discharge flow path 1342.

The structure for coupling the valve housing 1330 and the valve cover 1340 may be variously changed in accordance with required conditions and design specifications.

For example, a catching protrusion (not illustrated) may be provided on an outer peripheral surface of the valve housing 1330, and a catching projection (not illustrated) configured to lock the catching protrusion may be provided on the inner peripheral surface of the valve cover 1340. Therefore, as the catching protrusion and the catching projection are locked to each other, the arrangement state of the valve cover 1340 relative to the valve housing 1330 may be locked.

According to another example of the second embodiment of the present disclosure, the valve housing and the valve cover may be coupled to each other by means of a separate fastening member.

According to the second exemplary embodiment of the present disclosure, the condensate water storage device 1100 may include: guide slots 1344 provided in the valve cover 1340; and guide protrusions 1316 provided on the valve member 1310 and configured to be accommodated in the guide slots 1344 and movable along the guide slots 1344.

As described above, the valve member 1310 rectilinearly moves relative to the valve housing 1330 in the state in which the guide protrusions 1316 are accommodated in the guide slots 1344. Therefore, it is possible to obtain an advantageous effect of more stably supporting the rectilinear movement of the valve member 1310 relative to the valve housing 1330 and more effectively inhibiting the separation and torsion of the valve member 1310.

According to the second exemplary embodiment of the present disclosure, the valve unit 1300 may include an elastic member 1350 configured to elastically support the movement (rectilinear movement) of the valve member 1310 relative to the valve housing 1330.

More specifically, the elastic member 1350 serves to provide an elastic force that allows the valve member 1310 to move to the first position.

As described above, the movement (rectilinear movement) of the valve member 1310 relative to the valve housing 1330 is elastically supported by the elastic member 1350. Therefore, when the attractive force is not applied between the valve magnetic element 1320 and the base magnetic element 2a (the object moves away from the treatment target location), the valve member 1310 may be returned by the elastic force of the elastic member 1350 to the first position at which the valve member 1310 closes the discharge hole 1211.

A typical elastic means capable of elastically supporting the movement of the valve member 1310 relative to the valve housing 1330 may be used as the elastic member 1350. The present disclosure is not restricted or limited by the type and structure of the elastic member 1350.

For example, a spring may be used as the elastic member 1350. The elastic member 1350 may be elastically compressible and restorable and interposed between the valve cover 1340 and the valve member 1310.

In the second embodiment of the present disclosure, the example has been described in which the elastic member 1350 is supported by the valve cover 1340. However, according to another example of the second embodiment of the present disclosure, the elastic member may be supported on the storage container or other components adjacent to the storage container.

According to the second exemplary embodiment of the present disclosure, the condensate water storage device 1100 may include overflow holes 1219 provided in the container main body 1210, and the condensate water may be discharged to the outside through the overflow holes 1219 when a water level of the condensate water exceeds a preset reference water level.

The overflow hole 1219 may be variously changed in structure and position in accordance with required conditions and design specifications.

As described above, the overflow holes 1219 may be provided in the container main body 1210, and the condensate water may be discharged to the outside through the overflow holes 1219 when an excessive amount of condensate water flows into the storage container 1200. Therefore, it is possible to obtain an advantageous effect of inhibiting damage to the storage container 1200 due to the inflow of the excessive amount of condensate water into the storage container 1200, thereby improving safety and reliability.

In addition, according to the second exemplary embodiment of the present disclosure, the condensate water storage device 1100 may include a level sensor (not illustrated) disposed in the storage container 1200 and configured to measure the water level of the condensate water.

For example, the level sensor may be disposed on the sidewall portion of the container main body 1210. The level sensor may collect the water levels of the condensate water stored in the container main body 1210.

Various sensors capable of collecting the water levels of the condensate water may be used as the level sensor. The present disclosure is not restricted or limited by the type of level sensor and the method of measuring the water level.

For example, a contact level sensor (e.g., a float switch) or a contactless level sensor (e.g., an ultrasonic level sensor or a capacitance level sensor), which may collect the water level of the condensate water, may be used as the level sensor.

According to the second exemplary embodiment of the present disclosure, the condensate water storage device 1100 may include an alarm generation unit (not illustrated) configured to generate an alarm signal when the detection result of the level sensor indicates that the water level of the condensate water exceeds the preset reference water level.

In this case, the alarm signal may include at least one of an auditory alarm signal made by a typical sound means and a visual alarm signal made by a typical warning lamp. In addition, other various alarm signals may be used to inform a user (operator) of a situation in which the water level of the condensate water is excessively increased.

As described above, when the water level of the condensate water exceeds the preset reference water level, the alarm signal may be generated, and the condensate water may be discharged in a timely manner. Therefore, it is possible to obtain an advantageous effect of inhibiting damage to the storage container 1200 due to the inflow of the excessive amount of condensate water into the storage container 1200 and minimizing a situation in which the condensate water, which is produced while the fuel cell stack 20 operates, is discharged onto the floor of the workplace.

Figure 17:
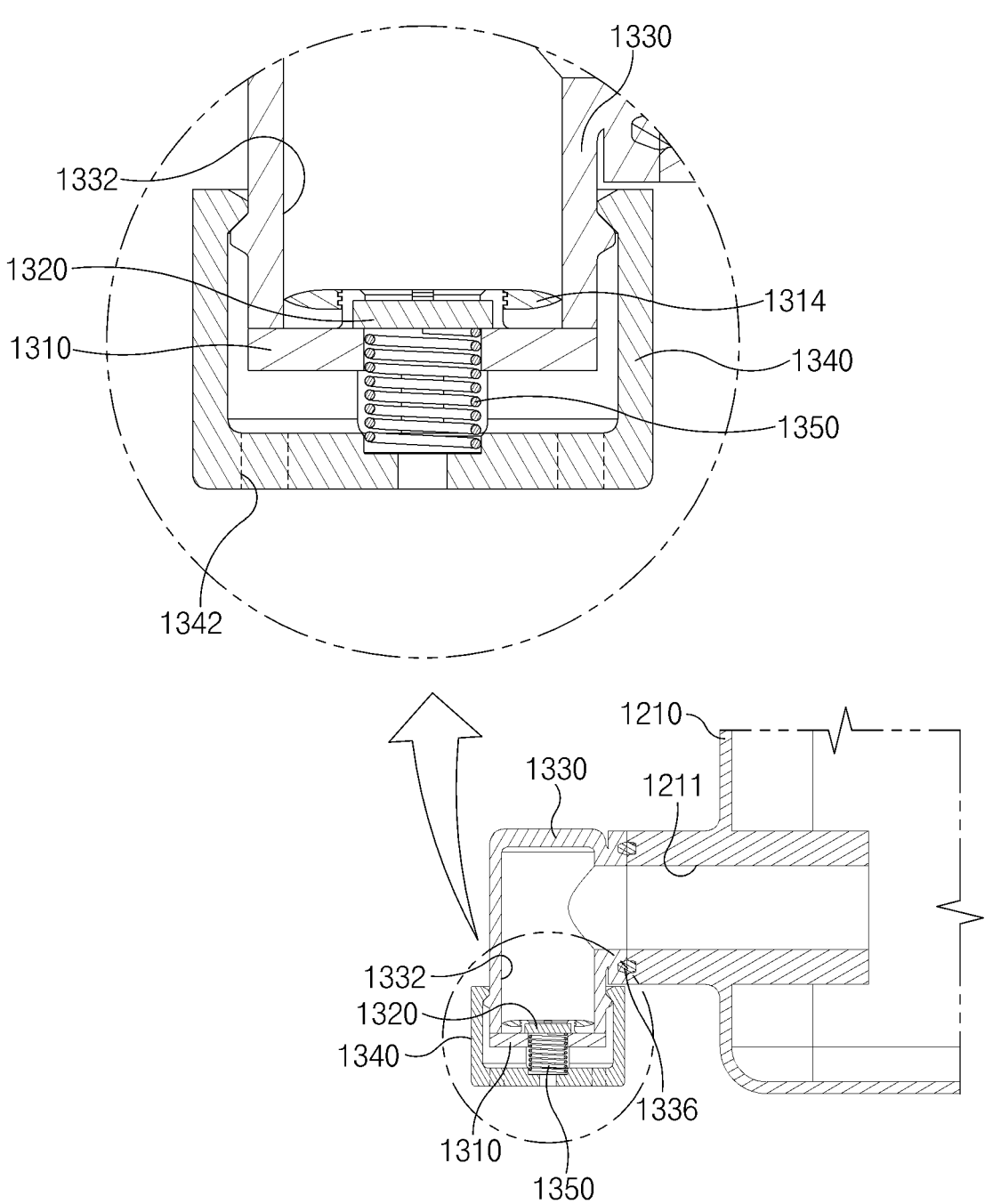
FIG. 17 is a view for explaining a closed state of a discharge hole of the fuel cell system according to the second embodiment of the present disclosure.
Figure 18:
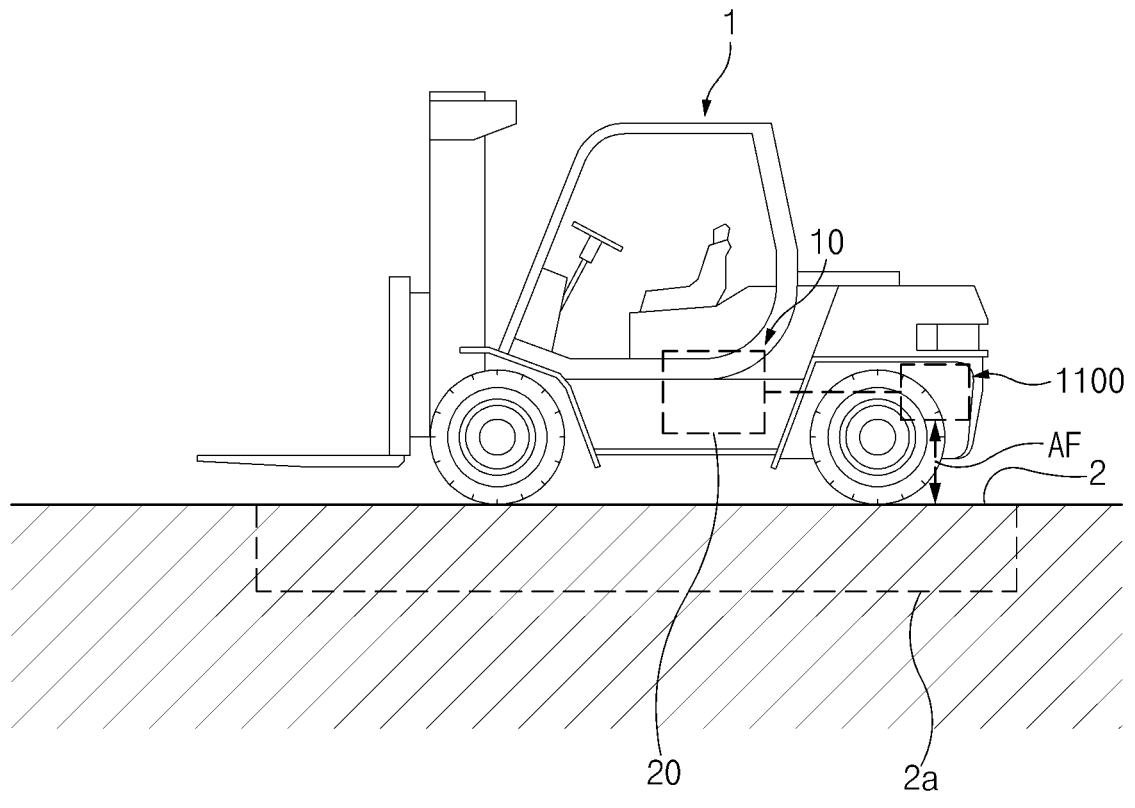
FIGS. 18 and 19 are views for explaining an opened state of the discharge hole of the fuel cell system according to the second embodiment of the present disclosure.

Meanwhile, FIG. 17 is a view for explaining a closed state of the discharge hole of the fuel cell system according to the second embodiment of the present disclosure, and FIGS. 18 and 19 are views for explaining an opened state of the discharge hole of the fuel cell system according to the second embodiment of the present disclosure.

Referring to FIG. 17, in a state in which the object 1 is positioned out of the treatment target location 2 (the attractive force is not applied between the valve magnetic element and the base magnetic element), the valve member 1310 may be disposed at the position (first position) at which the valve member 1310 closes the communication hole 1332. The state in which the valve member 1310 closes the communication hole 1332 may be elastically supported by the elastic force of the elastic member 1350.

In contrast, referring to FIGS. 18 and 19, when the object 1 is positioned at the treatment target location 2 (the valve magnetic element is moved to the position at which the valve magnetic element and the base magnetic element may generate the attractive force), the attractive force (AF) is applied between the valve magnetic element 1320 and the base magnetic element 2a. Therefore, the communication hole 1332 may be opened as the valve member 1310 is moved (in the downward direction) to the second position at which the valve member 1310 opens the discharge hole 1211. In this case, the elastic member 1350 may be compressed while accumulating the elastic force. When the communication hole 1332 is opened, the condensate water W stored in the storage container 1200 may be discharged to the outside via the discharge flow paths 1342.

According to the embodiment of the present disclosure described above, it is possible to obtain an advantageous effect of selectively adjusting whether to discharge the condensate water.

In particular, according to the embodiment of the present disclosure, it is possible to obtain an advantageous effect of selectively discharging the condensate water, which is produced from the fuel cell stack, to the predetermined particular location.

In addition, according to the embodiment of the present disclosure, it is possible to obtain an advantageous effect of reducing the risks of contamination and accident caused by the discharge of condensate water.

In addition, according to the embodiment of the present disclosure, it is possible to obtain an advantageous effect of improving safety and reliability and creating a comfortable working environment.

In addition, according to the embodiment of the present disclosure, it is possible to obtain an advantageous effect of selectively discharging condensate water from the storage container without additionally providing a pump or motor for discharging condensate water from the storage container.

In addition, according to the embodiment of the present disclosure, it is possible to obtain an advantageous effect of simplifying the structure and improving the degree of design freedom and spatial utilization.

In addition, according to the embodiment of the present disclosure, it is possible to obtain an advantageous effect of minimizing the amount of condensate water remaining in the humidifier and minimizing deterioration in humidification performance caused by frozen condensate water.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A condensate water storage device comprising:
a storage container having an inlet port through which treatment target gas is introduced, and an outlet port through which the treatment target gas is discharged, the storage container being configured to store condensate water contained in the treatment target gas; and
a discharge member comprising a first end immersed in the condensate water in the storage container and a second end exposed outside of the storage container, the discharge member being configured to selectively discharge the condensate water to the outside of the storage container based on a supply pressure of the treatment target gas introduced into the storage container,
wherein the storage container comprises:
a container main body defining a storage space configured to store the condensate water; and
a container cover disposed at an upper side of the container main body and configured to cover the storage space,
wherein the discharge member is disposed in the container cover,
wherein when the supply pressure of the treatment target gas is higher than a reference pressure, the condensate water is discharged to the outside through the discharge member,
wherein the first end of the discharge member has a first cross-sectional area, and the second end of the discharge member has a second cross-sectional area smaller than the first cross-sectional area,
wherein a cross-sectional area of the discharge member gradually decreases from the first end to the second end of the discharge member,
an opening/closing member configured to selectively open and close the outlet port,
wherein when the supply pressure of the treatment target gas is higher than a reference pressure, the opening/closing member closes the outlet port, and the condensate water is discharged to the outside through the discharge member, and
wherein the opening/closing member comprises:
a valve seat configured to be movable in a direction toward and away from the outlet port; and
a support part configured to elastically support a movement of the valve seat relative to the storage container, and
the support part elastically connects the outlet port and the valve seat, and the support part may selectively define a gap between the outlet port and the valve seat.

2. The condensate water storage device of claim 1, comprising:

a sealing member disposed between the container main body and the container cover.

3. The condensate water storage device of claim 1, comprising:

a fixing member configured to fix the discharge member to the container cover.

4. The condensate water storage device of claim 3, comprising:

a sealing member disposed between the fixing member and the discharge member.

5. A fuel cell system comprising:

a fuel cell stack;

a storage container having an inlet port through which exhaust gas discharged from the fuel cell stack is introduced, and an outlet port through which the exhaust gas is discharged, the storage container being configured to store condensate water contained in the exhaust gas; and a discharge member comprising a first end immersed in the condensate water in the storage container and a second end exposed to the outside of the storage container, the discharge member being configured to selectively discharge the condensate water to the outside of the storage container based on a supply pressure of the exhaust gas introduced into the storage container, wherein the storage container comprises:

a container main body defining a storage space configured to store the condensate water; and a container cover disposed at an upper side of the container main body and configured to cover the storage space, wherein the discharge member is disposed in the container cover, wherein when the supply pressure of the treatment target gas is higher than a reference pressure, the condensate water is discharged to the outside through the discharge member, wherein the first end of the discharge member has a first cross-sectional area, and the second end of the discharge member has a second cross-sectional area smaller than the first cross-sectional area, wherein a cross-sectional area of the discharge member gradually decreases from the first end to the second end of the discharge member, an opening/closing member configured to selectively open and close the outlet port, wherein when the supply pressure of the exhaust gas is higher than a reference pressure, the opening/closing member closes the outlet port, and the condensate water is discharged to the outside through the discharge member, wherein the opening/closing member comprises:

a valve seat configured to be movable in a direction toward and away from the outlet port; and a support part configured to elastically support a movement of the valve seat relative to the storage container, and the support part elastically connects the outlet port and the valve seat, and the support part may selectively define a gap between the outlet port and the valve seat.

6. The fuel cell system of claim 5, comprising:

a compressor configured to compress inflow gas to be supplied to the fuel cell stack, wherein the supply pressure of the exhaust gas is adjusted by a pressure of the inflow gas by the compressor.

7. The fuel cell system of claim 6, comprising:

a humidifier disposed between the compressor and the fuel cell stack and configured to humidify the inflow gas using the exhaust gas; and an air control valve disposed between the humidifier and the fuel cell stack and comprising a bypass flow path configured to selectively allow the inflow gas, which is to be introduced into the fuel cell stack, to flow to the humidifier.

8. The fuel cell system of claim 5, comprising:

a sealing member disposed between the container main body and the container cover.

9. The fuel cell system of claim 5, comprising:

a fixing member configured to fix the discharge member to the container cover.

10. The fuel cell system of claim 9, comprising:

a sealing member disposed between the fixing member and the discharge member.

* * * * *